United States Patent
Miller et al.

(10) Patent No.: US 6,643,569 B2
(45) Date of Patent: Nov. 4, 2003

(54) METHOD AND SYSTEM FOR DETECTING A FAILURE OR PERFORMANCE DEGRADATION IN A DYNAMIC SYSTEM SUCH AS A FLIGHT VEHICLE

(75) Inventors: Robert H. Miller, Del Mar, CA (US); William B. Ribbens, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1 day.

(21) Appl. No.: 10/109,028

(22) Filed: Mar. 28, 2002

(65) Prior Publication Data

US 2002/0193920 A1 Dec. 19, 2002

Related U.S. Application Data

(60) Provisional application No. 60/280,081, filed on Mar. 30, 2001.

(51) Int. Cl.$^7$ .................................................. G06F 7/00
(52) U.S. Cl. .............................. 701/29; 701/31; 701/35
(58) Field of Search ................................ 701/1, 29, 30, 701/31, 36, 32, 33, 34, 35

(56) References Cited

U.S. PATENT DOCUMENTS

| | | |
|---|---|---|
| 3,603,948 A | 9/1971 | Medlinski |
| 3,678,256 A | 7/1972 | Harenberg, Jr. |
| 4,312,041 A | 1/1982 | DeJonge |
| 4,355,358 A | 10/1982 | Clelford et al. |
| 5,070,458 A | 12/1991 | Gilmore et al. |
| 5,195,046 A | 3/1993 | Gerardi et al. |
| 5,301,905 A | 4/1994 | Blaha |
| 5,615,119 A | 3/1997 | Vos |
| 5,760,711 A | 6/1998 | Burns |
| 5,819,188 A | 10/1998 | Vos |
| 5,838,261 A | 11/1998 | Lauta et al. |
| 5,919,267 A | 7/1999 | Urnes et al. |
| 6,052,056 A | 4/2000 | Burns et al. |
| 6,085,127 A | 7/2000 | Vos |

OTHER PUBLICATIONS

Ribbens, William, et al., Detection Of Icing And Related Loss Of Control Effectiveness In Regional And Corporate Aircraft, Aviation Conference, SAE, Jan. 29, 1999.

Miller, Robert H., Et al., Detection Of The Loss Of Elevator Effectiveness Due To Aircraft Icing, No. 99–0637, 37$^{th}$ Aerospace Sciences, AIAA, Jan. 1999.

Miller, Robert H. et al., The Effects Of Icing On The Longitudinal Dynamics Of An Icing Research Aircraft, No. 99–0636, 37$^{th}$ Aerospace Sciences, AIAA, Jan. 1999.

Melody, James W., Et al., Parameter Identification For Inflight Detection And Characterization Of Aircraft Icing, Elsevier Science Ltd., 2000.

*Primary Examiner*—Richard M. Camby
(74) *Attorney, Agent, or Firm*—Brooks Kushman P.C.

(57) ABSTRACT

A method and system for detecting a failure or performance degradation in a dynamic system having sensors for measuring state variables and providing corresponding output signals in response to one or more system input signals are provided. The method includes calculating estimated gains of a filter and selecting an appropriate linear model for processing the output signals based on the input signals. The step of calculating utilizes one or more models of the dynamic system to obtain estimated signals. The method further includes calculating output error residuals based on the output signals and the estimated signals. The method also includes detecting one or more hypothesized failures or performance degradations of a component or subsystem of the dynamic system based on the error residuals. The step of calculating the estimated values is performed optimally with respect to one or more of: noise, uncertainty of parameters of the models and un-modeled dynamics of the dynamic system which may be a flight vehicle or financial market or modeled financial system.

38 Claims, 3 Drawing Sheets

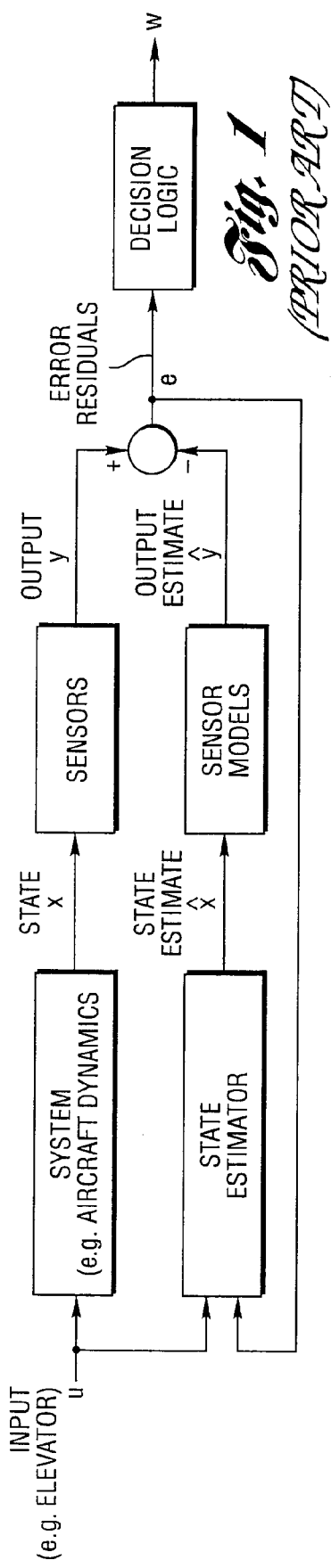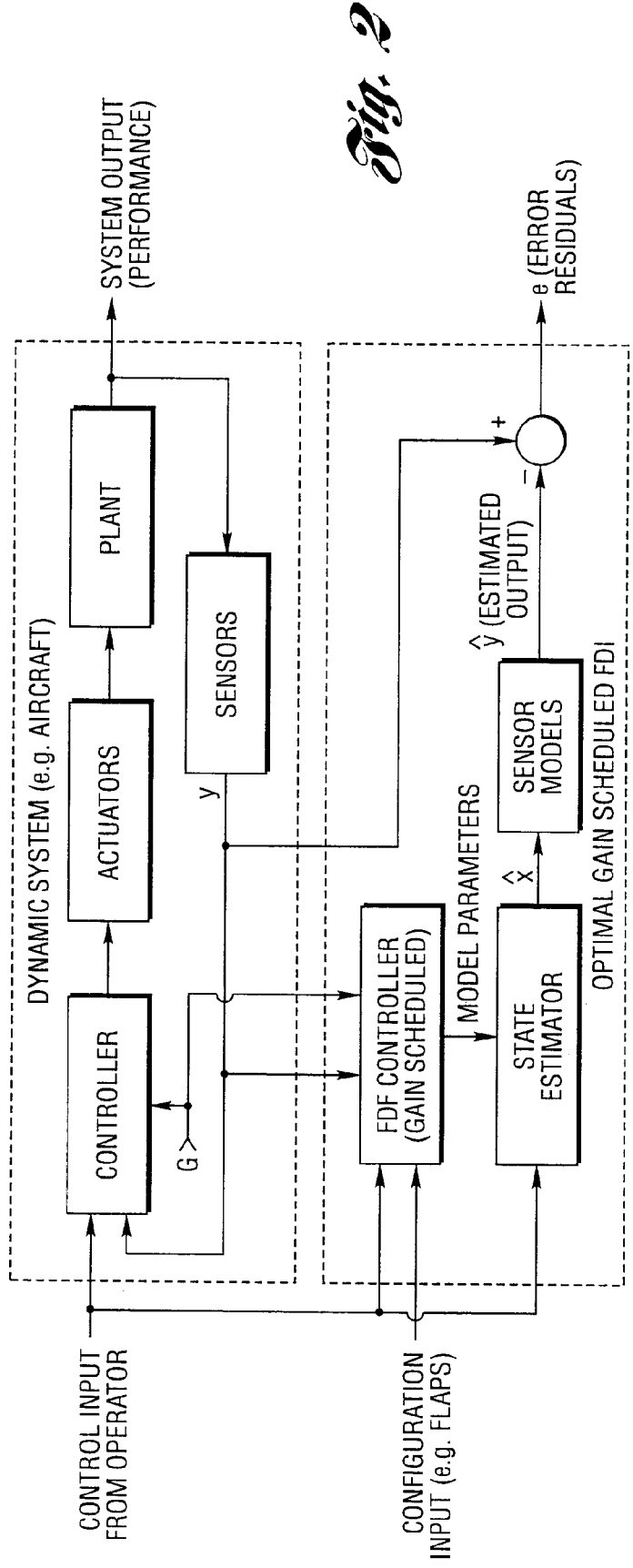
Fig. 1 (PRIOR ART)
Fig. 2

METHOD AND SYSTEM FOR DETECTING A FAILURE OR PERFORMANCE DEGRADATION IN A DYNAMIC SYSTEM SUCH AS A FLIGHT VEHICLE

CROSS-REFERENCE TO RELATED APPLICATION

This application claims the benefit of U.S. provisional application Serial No. 60/280,081, filed Mar. 30, 2001.

STATEMENT REGARDING FEDERALLY SPONSORED RESEARCH OR DEVELOPMENT

This invention was made with government support under NASA Grant No. NGT4-52404. The government has certain rights in the invention.

BACKGROUND OF THE INVENTION

1. Field of the Invention

This invention relates to methods and systems for detecting failures or performance degradation in dynamic systems such as flight vehicles.

2. Background Art

FIG. 1 is a representation of the prior art, which depicts failure detection and isolation (i.e., FDI) of flight vehicle icing. Generally, the method of this prior art teaches detection and isolation of failures in flight vehicles that result in a loss of control effectiveness. Detection and isolation of failures is accomplished via a linear state estimator or observer that continuously calculates an estimate $\hat{x}$ of the state vector x of the flight vehicle dynamic system in question. The flight vehicle dynamic system is assumed to have sensors available for measuring some or all of the state variables. The measured values y are normally present as part of the dynamic system.

The state estimator calculates estimated values $\hat{y}$ of the sensor outputs and is designed such that for no system failures the estimated values $\hat{y}$ agree with measured sensor values y. Whenever system failures (as described above) occur, there is a non-zero error e difference between y and $\hat{y}$:

$$e = y - \hat{y}.$$

Each state estimator is designed to detect and isolate a particular hypothesized failure mode $f$.

The feedback gains for the state estimator are chosen such that the error residuals for a given hypothesized failure are in a unique direction in output space. Isolation of the failure from other possible failures is done via the directionality of the error residuals.

The state estimator is a linear Luenberger-type observer which represents a dynamic system that has dynamics typically given by nonlinear mathematical models. The dynamics are typically a linearized model of a nonlinear system. In this case, the models can be obtained from empirical measurement of dynamic system performance through instrumented flight test or through mathematical modeling of the system. The nonlinear models may be obtained from the above data by any of a number of standard regression techniques as is known in the art.

The state estimator is an observer of the form:

$$\dot{\hat{x}} = A\hat{x} + Bu + L(y - \hat{y})$$

$$\hat{y} = C\hat{x} + Du,$$

where A and B are the state transition and input matrices, respectively, of the nominal reference model for the system dynamics, and D is the estimator gain matrix that is chosen such that the output error residual $e = y - \hat{y}$ is one dimensional. The design of the estimator gain is explained in section 2.1 of Appendix A hereto. The nominal matrices A and B are obtained by linearizing the system nonlinear models at an operating point and are approximately valid representations of the dynamic system in a neighborhood of that operating point. Other sets of matrices are required to characterize flight vehicle dynamics over the entire flight envelope.

It was previously recognized by the inventors that some procedure could be found for selecting operating points and associated neighborhoods, and representing the dynamic system within that neighborhood based on certain operating parameters for the dynamic system (e.g., flap setting angles for flight vehicles). This procedure is called "gain scheduling" in the prior art papers authored by the inventors.

However, it was not known or shown in the prior art how to select operating points or how large the neighborhoods could be to achieve acceptable error levels for the FDI.

It was also recognized in the prior art papers authored by the inventors and noted herein below that detection and isolation of hypothesized failures could be accomplished by examining the magnitude of error residuals along the direction of the output of the FDI for the hypothesized failure.

U.S. Pat. Nos. 5,615,119; 5,819,188; and 6,085,127 to Vos disclose fault tolerant automatic control systems utilizing analytic redundancy. The systems are used for controlling a dynamic device, preferably a flight vehicle. The systems include a processing structure which controls the operation of the systems. In operation, the processing structure transforms sensed dynamic device control criteria into a linear time invariant coordinate system, determines an expected response for the device according to the transformed control criteria, compares the expected response with a measured response of the device and reconfigures the control means based on the comparison.

U.S. Pat. No. 4,355,358 to Clelford et al. discloses an adaptive flight vehicle actuator fault detection system. The system, utilizing sensors to determine the position of various operating devices within a flight vehicle, compares the positions with expected positions provided by an operating model of the flight vehicle. Thereafter, the system provides fault warnings, based upon the actual device operating conditions and the expected operating conditions obtained from the model.

U.S. Pat. No. 5,919,267 to Urnes et al. discloses a neural network fault diagnostics system and method for monitoring the condition of a host system, preferably a flight vehicle including a plurality of subsystems. The system includes a neural network means for modeling the performance of each subsystem in a normal operating mode and a plurality of different failure modes. The system also includes a comparator means for comparing the actual performance of each subsystem with the modeled performance in each of the normal and possible failure modes. Finally, the system includes a processor for determining, based on the comparisons of the comparator, the operating condition of the host system.

U.S. Pat. No. 5,070,458 to Gilmore et al. discloses a method of analyzing and predicting both airplane and engine performance characteristics. In operation, the system monitors the operation of a flight vehicle during flight and stores the monitored parameters and flight circumstances in a memory. Thereafter, during subsequent flights, the system determines and/or predicts how the flight vehicle should be operating.

U.S. Pat. No. 4,312,041 to DeJonge discloses a flight performance data computer system. In operation, the system monitors the operation of various operating characteristics of a flight vehicle during flight and provides an indication of the characteristics to the flight vehicle operator. The information provided by the system assists the operator during the flight.

U.S. Pat. Nos. 5,195,046; 5,838,261; and 6,052,056 disclose various systems for monitoring the performance of dynamic flight vehicle subsystems and providing an indication of the performance to the flight vehicle operator.

U.S. Pat. No. 3,603,948 discloses fault identification, isolation, and display device for testing a flight vehicle control system. The device senses malfunctions in selected portions of the system and provides a visual display which instantaneously identifies and isolates the malfunctioning section and memorizes the fault status of the section until the device is manually or automatically reset.

U.S. Pat. No. 3,678,256 discloses a performance and failure assessment monitor which assesses overall performance of the operation of the automatic landing mode of a flight control system for a flight vehicle. The monitor is connected to various sensors throughout the flight vehicle so that it can compare what the flight control system of the flight vehicle is accomplishing during a landing maneuver against an independent model generated within the monitor of what the flight control system should be accomplishing. The resultant comparison is displayed to the pilot as a measure of relative confidence that the landing will be accomplished properly. The monitor also includes failure verification and failure reversion control for making immediate and accurate assessments of the consequence of a failure of any component in the flight vehicle which in any way affects the ability of the flight control and flight guidance instrument systems to operate properly, for correcting the failure when possible and for displaying only the critical failure information to the pilot of the flight vehicle.

U.S. Pat. No. 5,760,711 discloses a modulated light source (31) which transmits light pulses via a prism (27) through a monofilament optical fiber light channel (20) to an optical sensor (10) remotely located and flush mounted to an aerodynamic surface (14) of the flight vehicle most likely to accrete ice. In the absence of ice, little to no light is reflected inward via the light channel. When water, ice, or de-icing fluid covers the light sensor, an increased amount of light pulses are reflected inward through the single fiber optic light channel and prism assembly where they are detected by a light detector (34) which generates an electrical output signal indicative of the type, amount, and rate of ice accretion. The output signal is visually displayed (37) and the pilot may be audibly warned. In an alternate embodiment, the remote light sensor (70) is fuselage mounted (72) with an airfoil shaped probe (71) having a clear lucite leading edge (73) to which is secured a pair of fiber optic light pipes (75,76), one for outbound (76) and the other for inbound (75) light pulses. This mode requires no prism assembly. All electronics are housed in the computerized control/display unit (30) other than the fiber optic cable and remote mounted light sensor.

U.S. Pat. No. 5,301,905 discloses a flight vehicle icing detection system which detects accumulation of ice on an upper surface (12) of a wing (10) of a flight vehicle. The system includes an air pump (18) that delivers air through first and second conduits (24,26). The first conduit delivers air through a first air knife (32) to openings (34) in the upper surface of the wing. The second conduit delivers air through a lower wing surface (14) through openings in a second air knife (42). When ice accumulates on the upper surface, flow from the first air knife is restricted. A differential pressure sensor (46) senses a pressure difference between the conduits and warns the pilot of possible ice accumulation by illuminating a warning light (50).

The reference IFAC World Congress, "Parameter Identification for Inflight Detection of Aircraft Icing", July 1999, discloses the use of signal processing to detect icing using online parameter estimation. The reference identifies a new model and compares it to a baseline model, rather than looking only for a change in the baseline model.

The following papers authored by the inventors of this application are relevant and are hereby incorporated in their entirety herein:

William Ribbens and Robert H. Miller, "Detection of Icing and Related Loss of Control Effectiveness in Regional and Corporate Aircraft", AVIATION CONFERENCE, SAE, 1999;

Robert H. Miller and William B. Ribbens, "Detection of the Loss of Elevator Effectiveness Due to Icing", Number 99-0637, 37TH AEROSPACE SCIENCES, AIAA, January 1999; and Robert H. Miller and William B. Ribbens, "The Effects of Icing on the Longitudinal Dynamics of an Icing Research Aircraft", Number 99-0636, 37TH AEROSPACE SCIENCES, AIAA, January 1999.

Fault detection theory and other background material can be found in Appendix A hereto.

SUMMARY OF THE INVENTION

An object of the present invention is to provide an improved method and system for detecting a failure or performance degradation in a dynamic system such as a flight vehicle.

In general, performance degradation means a very small but statistically significant change in a parameter or group of parameters in a mathematical model of the system.

In carrying out the above object and other objects of the present invention, a method for detecting a failure or performance degradation in a dynamic system having sensors for measuring state variables of the system and providing corresponding output signals in response to at least one system input signal is provided. The method includes calculating estimated gains of a filter and selecting an appropriate linear model for processing the output signals based on at least one system input signal. The step of calculating utilizes at least one model of the dynamic system to obtain estimated signals. The method also includes calculating output error residuals based on the output signals and the estimated signals. The method further includes detecting at least one hypothesized failure or performance degradation of a component or subsystem of the dynamic system based on the error residuals. The step of calculating the estimated gains is performed optimally with respect to one or more of: noise, uncertainty of parameters of the at least one model and un-modeled dynamics of the dynamic system.

The step of calculating estimated gains may be performed continually.

The dynamic system may be a closed-loop dynamic system.

The method may further include generating a signal for each hypothesized failure or performance degradation and storing each signal in a database for subsequent retrieval.

The method may further include generating a signal for each hypothesized failure or performance degradation and processing each signal to diagnose the at least one hypothesized failure or performance degradation.

The method may further include generating a signal for each hypothesized failure or performance degradation and processing each signal to obtain a reconfiguration signal.

The dynamic system may have a controller wherein the method may further include reconfiguring the controller based on the reconfiguration signal to compensate for the at least one hypothesized failure or performance degradation.

At least one hypothesized failure or performance degradation may be a failure or degradation of one of the sensors.

The reconfiguration signal may insert an estimated or compensated value of the output signal of the failed or degraded sensor into the controller.

The dynamic system may have a controller and at least one actuator wherein the method may further include reconfiguring the controller based on the reconfiguration signal to compensate for a change of the at least one actuator.

The dynamic system may be a flight vehicle and the sensors may include flight control sensors. The dynamic system may also be a financial market or a modeled financial system.

The dynamic system may be a physical system characterized by a nonlinear dynamic model having parameters. The changes in the dynamic system may be manifest by parameter changes in the nonlinear dynamic model.

The error residuals may be propagated in a unique direction in output detection space for a given hypothesized failure or performance degradation.

The step of calculating estimated gains may include the step of controllably selecting parameters of the at least one model.

The step of detecting may detect intermittent faults and may be based on magnitude and direction of the error residuals in the detection space.

At least one model may include non-dimensional variables wherein the step of detecting may include the step of converting from the non-dimensional variables to dimensional variables to obtain re-scaled error residuals and wherein the step of detecting is also based on the re-scaled error residuals.

A plurality of mathematical models may be utilized to model the dynamic system wherein the step of calculating estimated gains may include the step of selecting one of the plurality of mathematical models.

Further in carrying out the above object and other objects of the present invention, a detection system for detecting a failure or performance degradation in a dynamic system having sensors for measuring state variables of the dynamic system and providing corresponding output signals in response to at least one system input signal is provided. The detection system includes means for calculating estimated gains of a filter and choosing an appropriate linear model for processing the output signals based on the at least one input signal. The means for calculating utilizes at least one model of the dynamic system to obtain estimated signals. The system further includes means for calculating output error residuals based on the output signals and the estimated signals. The system also includes means for detecting at least one hypothesized failure or performance degradation of a component or subsystem of the dynamic system based on the error residuals. The means for calculating the estimated gains calculates optimally with respect to one or more of: noise, uncertainty of parameters of the at least one model and un-modeled dynamics of the dynamic system.

The estimated gains may be calculated continually.

The dynamic system may be a closed-loop dynamic system.

The detection system may further include means for generating a signal for each hypothesized failure or performance degradation and a database for storing each signal for subsequent retrieval.

The detection system may further include means for generating a signal for each hypothesized failure or performance degradation and means for processing each signal to diagnose the at least one hypothesized failure or performance degradation.

The detection system may further include means for generating a signal for each hypothesized failure or performance degradation and means for processing each signal to obtain a reconfiguration signal.

The dynamic system may have a controller and the detection system may further include means for reconfiguring the controller based on the reconfiguration signal to compensate for the at least one hypothesized failure or performance degradation.

At least one hypothesized failure or performance degradation may be a failure or degradation of one of the sensors.

The reconfiguration signal may insert an estimated or compensated value of the output signal of the failed or degraded sensor into the controller.

The dynamic system may have a controller and at least one actuator and the detection system may further include means for reconfiguring the controller based on the reconfiguration signal to compensate for a change of the at least one actuator.

The dynamic system may be a flight vehicle and the sensors may include flight control sensors. The dynamic system may also be a financial market or modeled financial system.

The dynamic system may be a physical system characterized by a nonlinear dynamic model having parameters and the changes in the dynamic system may be manifest by parameter changes in the nonlinear dynamic model.

The error residuals may be propagated in a unique direction in output detection space for a given hypothesized failure or performance degradation.

The means for calculating estimated gains may include means for controllably selecting parameters of the at least one model.

The means for detecting may detect intermittent faults.

The means for detecting may detect based on magnitude and direction of the error residuals in the detection space.

At least one model may include non-dimensional variables and the means for detecting may include means for converting from the non-dimensional variables to dimensional variables to obtain re-scaled error residuals and the means for detecting may detect based on the re-scaled error residuals.

A plurality of mathematical models may be utilized to model the dynamic system and the means for calculating estimated gains may include means for selecting one of the plurality of mathematical models.

In general, the method of designing or calculating the filter gains is based upon a optimization problem solving linear matrix inequality optimization problem with a subset of the eigenstructure specified. The optimization metric can be based upon minimizing the variance, the maximum deviation, the infinity norm, or any quadratic or linear cost function.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram of a prior art dynamic system and system for detecting and isolating failures in the dynamic system;

FIG. 2 is a block diagram of a dynamic system and a gain-scheduled FDI constructed in accordance with the present invention to obtain error residuals;

DETAILED DESCRIPTION OF THE PREFERRED EMBODIMENTS

FIG. 2 is a block diagram of an embodiment of the present invention. Implicit in this block diagram is the generalization of the prior art method to all major components of a flight vehicle control system, including the control surfaces (part of the dynamic system block), actuators, sensors and the electronic control system itself. Furthermore, this block diagram depicts a general dynamic system (not just a flight vehicle) that can be any system characterized by nonlinear dynamic models such as a financial system modeled using the principles of econometrics and mathematics (e.g., a model of the stock market).

The present invention is similar to the prior art in that it employs a gain-scheduled state estimator to detect failures in a dynamic system (for which a flight vehicle is a special case) and that the state estimator gains are designed to propagate error residuals in a unique direction in output space for a given hypothesized failure. In the prior art, detection and isolation of flight vehicle pitch control is done with a simple amplitude comparison of the error residual magnitude along the hypothesized failure. While the prior art teaches detection and isolation of sensor failures, the prior art is only applicable to systems characterized by linear dynamic models. In particular, the method of the present invention would not be applicable to flight vehicle control sensors since the relevant models have substantial nonlinearities. Errors associated with a linear FDI would not yield acceptable performance for finding errors in flight vehicle control sensors.

Significant advances over the prior art are made in the present invention as embodied in FIG. 2. In this Figure, the specific components and/or subsystems of the present system of detecting and isolating failures are shown. Also depicted in FIG. 2 is an FDF controller that is responsible for setting the state estimator parameters including the state transition matrix A, the input matrix B, and the gain matrix L.

Figure 3:
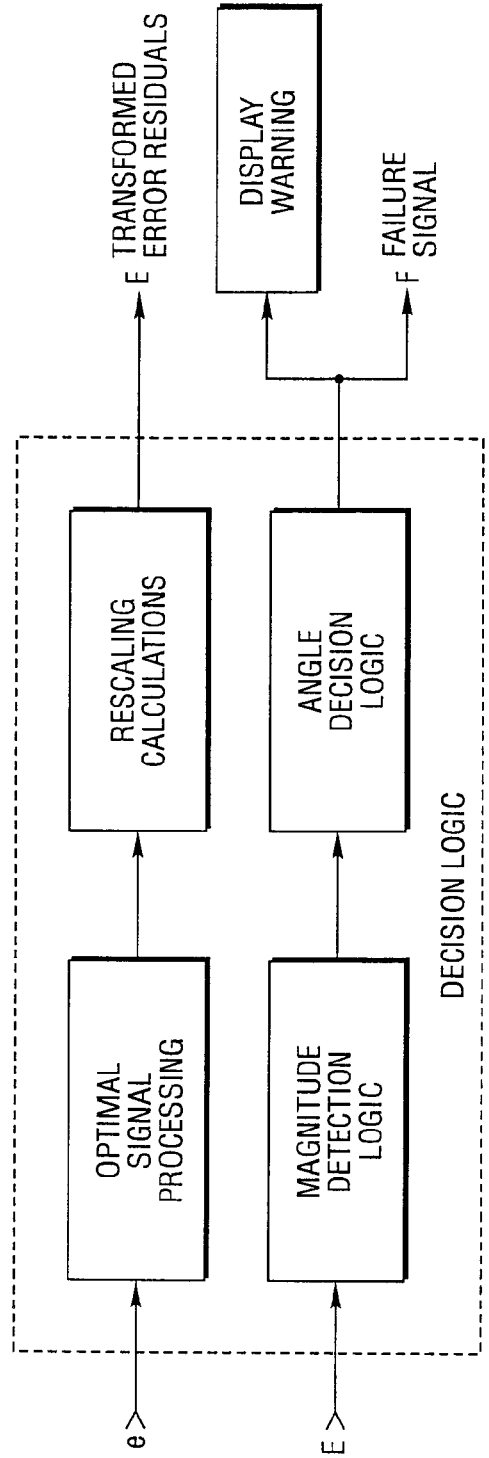
FIG. 3 is a block diagram of a decision logic subsystem which utilizes the error residuals obtained in FIG. 2 to generate a binary failure signal and a warning signal.

The block diagram of FIG. 3 shows a set of components incorporated in a decision logic block specifically showing advances over the prior art. These advances include optimal signal processing in the form of an optimal filter and vector product operations, rescaling calculations and two-step detection logic (as compared to prior art simple threshold comparison of amplitude).

Figure 4:
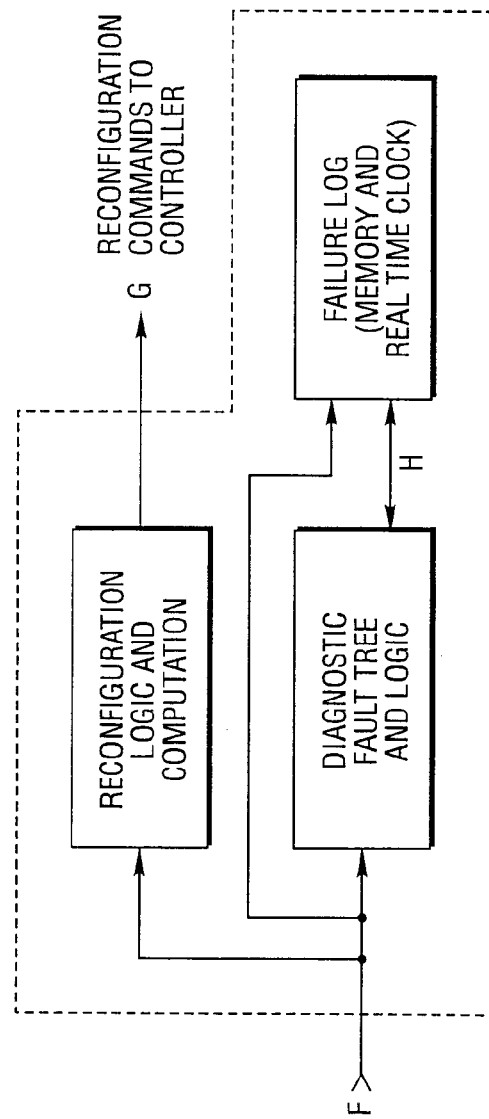
FIG. 4 is a block diagram of a subsystem which utilizes the binary failure signal obtained in FIG. 3 to generate a signal which can be utilized by the two controllers of FIG. 2, to store the failure signal in a failure or degradation log and to provide a diagnosis of the failure or degradation.

The block diagram of FIG. 4 depicts separate blocks for functions that are not anticipated in the prior art, including control reconfiguration and diagnostic fault tree analysis that is applicable, for example, to detecting and isolating intermittent faults. The diagnostic function has been considered in the prior art, but only in the sense of a gradual deterioration/degradation of performances of a component or subsystem. The potential for detecting intermittent faults is not found in the prior art.

As shown in FIG. 2, the present invention operates by generating output error residuals whenever there is a change in the dynamic system from the nominal system. Changes in the dynamic system are manifest by parameter changes in the non-linear dynamic model that characterizes its performance. The gain scheduled FDI block responds to these changes by generating an output (error residual) that, in a real sense, is a "signature" for the hypothesized failure event.

The dynamic system depicted in FIG. 2 includes a plant (e.g., flight vehicle), sensors, actuators, and a controller. The dynamic system as depicted in FIG. 2 is in the form of an electronically-controlled plant having feedback of plant variables via the sensors to the controller. A dynamic system having this structure is often referred to as a closed-loop system, whereas the plant by itself (which is a dynamic system) is often termed an open loop dynamic system. The present invention is equally applicable for detecting and isolating failures in open loop or closed-loop dynamic systems.

A change in a component or subsystem of a given dynamic system (constituting a failure or partial failure or degradation) yields a change in the output of one or more sensors from its nominal condition. The state estimator matrices (A, B, C, D, L) calculate the state of the nominal system and, using the nominal sensor models, generates the outputs $\hat{y}$ that the dynamic system sensors should have in the absence of a failure. The difference between actual y and nominal $\hat{y}$ constitutes the error residuals, e, associated with a given hypothesized failure.

The state estimator matrices (A, B, C, D, L) are supplied by the FDF controller block (e.g., via table look-up) to the state estimator based upon the nominal operating point of the dynamic system. The nominal operating point is characterized by system configuration and average values of certain variables. In the example of a transport category flight vehicle, the nominal operating point might include trailing edge, leading edge, flap settings, landing gear position, trim settings for control surfaces, thrust levels and approximate speed setting. The process of setting state estimator matrices as a function of nominal operating point is known as gain scheduling.

The possibility of gain scheduling is only mentioned briefly in one of the above-noted papers authored by the inventors. Only with the description of the present invention in the present application is gain scheduling employed for setting the state estimator matrices in great detail.

According to the prior art, a sub-optimal state estimator can be designed by assigning the poles of its closed-loop transfer function by well known prior art methods summarized in section 2.1 of Appendix A. The state estimator eigenstructure associated with the detection space is uniquely specified by the directionality requirement of the output error residuals. In the prior art, the remaining poles associated with the so-called completion space can be assigned arbitrarily in the left-half of the complex plane.

The method of the present invention uses linear matrix inequalities (LMI) to assign the poles and unspecified eigenstructure of the estimator closed-loop transfer function, thereby yielding the desired feedback gain L. (See, Appendix B entitled "Optimal Failure Detection Filters."). The design method based upon LMI for design of a state estimator is not found in the prior art.

Figure 5:
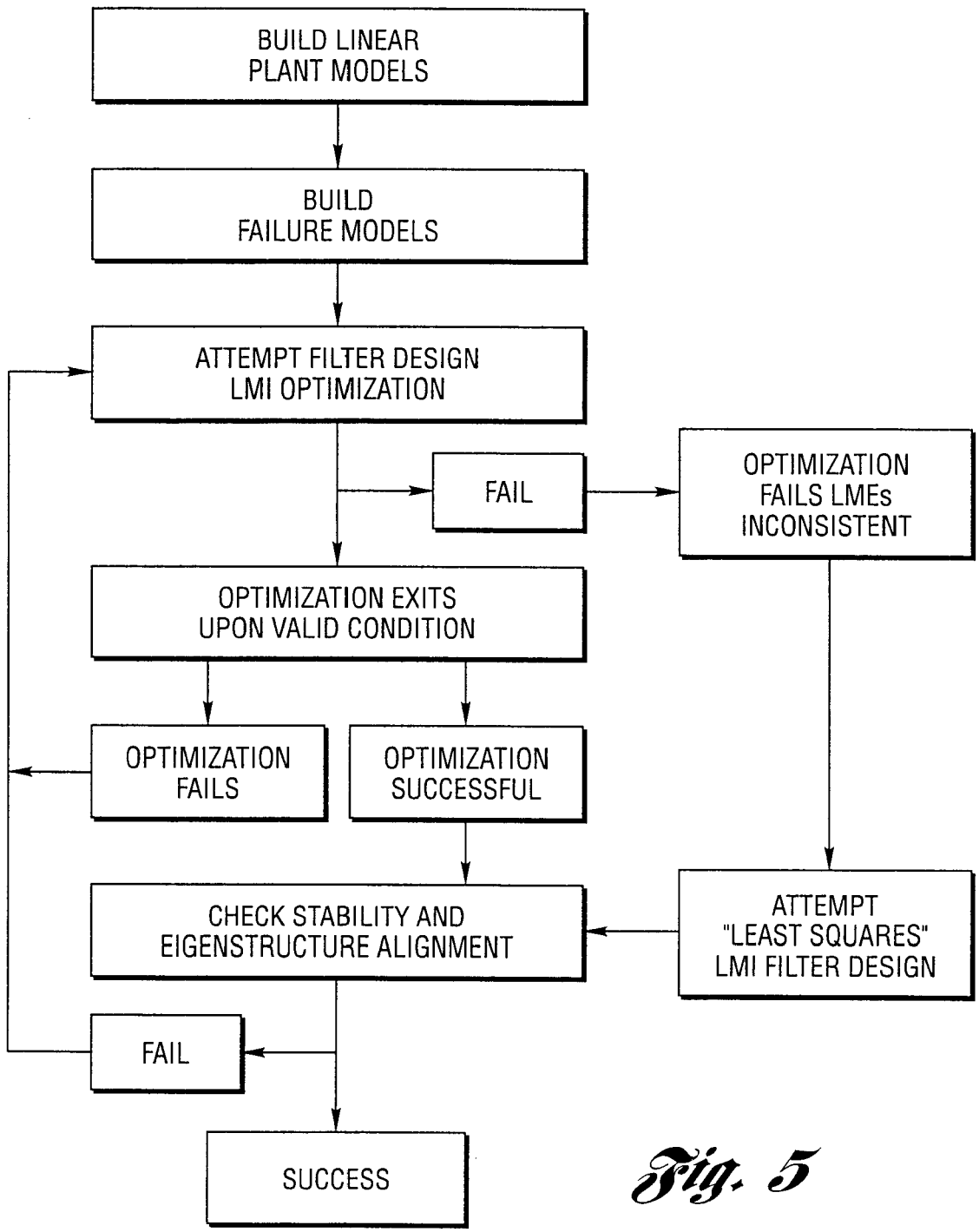
FIG. 5 is a block diagram flow chart illustrating an algorithm for designing a filter of the present invention as explained in detail in Appendix B.

One of the important issues in the design of any FDI is its robustness to noise, model parameter uncertainty and unmodeled dynamics. The LMI method of designing an FDI as illustrated in FIG. 5 and as used in the present method and system has improved robustness over prior art methods of design. As noted in Section 5.2 of Appendix B, the norm of the sensitivity function S is less than or equal to 1:

$$\|S\| \leq 1.$$

Another advance of the present method of detecting and isolating failures in a dynamic system is in the post-FDI detection process. A basis for this multi-step process comes from the basic nature of the system dynamic models. It is well known to one of ordinary skill in the art that it is common practice in aerospace applications to write the system dynamic equations (i.e., the model) in terms of non-dimensional variables. It is also possible to express, the system model in dimensional variables. Either modeling method yields equivalent results except that there are numerical benefits in choosing one method over another. In the present invention, the use of both modeling methods provides the opportunity to optimize signal/noise at the detection stage. The method of using both dimensional and non-dimensional modeling can substantially reduce error rates of detection and isolation relative to prior art methods. The method of converting from non-dimensional to dimensional variables is referred to herein as "resealing," as shown in FIG. 3.

Moreover, the present method is an advancement over the prior art by its combined use of error magnitude and direction in output space. The present method obtains a scalar metric $\phi_e$ of the output error residual vector (in an n dimensional vector space):

$$\phi_e = \arccos\left\{\frac{<e, CD_f>}{\|e\|\|CD_f\|}\right\}$$

where:

e=output error residual from the state estimator;

C=output matric (sensor model);

$D_f$=detection space $\|CD_f\|$=norm of the detection space (hypothesized failure); and $\|e\|$=norm of the error residual.

The FDI of the present invention declares that the hypothesized failure of the dynamic system has occurred when both the angle and magnitude of the error residuals satisfy the desired criteria. These criteria are specific to a given dynamic system and the associated process and measurement noise.

In addition to the improvements in the design of the FDI and post-FDI signal processing and detection methods of the present invention over the prior art, the present invention anticipates numerous applications not heretofore found in the prior art. The present invention can be utilized in the diagnosis of dynamic system problems that have not previously been tractable. For example, the diagnosis of intermittent faults has long proven to be a challenge to maintenance technicians. Problems of this nature are well known to automobile owners in the form of problems that occur on the road but refuse to be present in the repair shop.

The present invention can be used to diagnose these intermittent faults. A suitably designed FDI operating continuously when the dynamic system is operating will detect the hypothesized failure whenever it occurs. In the present invention, the decision logic subsystem of FIG. 3 has a binary-valued failure output signal or signature F, that is false (e.g., zero) whenever the system has no failure and is true (i.e., one) whenever the failure is present.

This binary failure signature is sent to a database with a log or "failure log" as shown in FIG. 4 which consist of a non-destructive memory and an internal real-time clock. The time of occurrence, duration and nature of the failure are stored in memory for later examination by maintenance technicians. The implementation of the failure log itself is well known to one of ordinary skill in the art. A separate failure binary signal F is provided for each hypothesized failure.

The block diagram of FIG. 4 depicts a sub-block labeled "diagnostic fault tree and logic." The output of this block is connected to the failure log sub-block via a multi-bit digital link H. The diagnostic fault tree sub-block has the capability for some real-time diagnosis of failures. This latter block can be brought into play whenever multiple failure signatures (i.e., F) have occurred. It is well known to one of ordinary skill in the art (of dynamic system design or of maintenance) that multiple failures are often symptoms of a larger system failure (e.g., power supply). A systematic diagnosis procedure (often called a "fault tree" and well known to maintenance technicians) can be used to diagnose such a system failure.

Another advance of the present invention over the prior art is depicted in the sub-block of FIG. 4 labeled "reconfiguration logic and computation." In certain cases, it is possible to compensate for a given failure by a reconfiguration of the dynamic system controller. For example, the failure of one sensor (in a multi-sensor control configuration) often has compensation in the form of data from the other sensors. It is often possible to estimate the output of the failed sensor via the state estimator. Acceptable (though suboptimal) dynamic system performance is often achievable by substituting the estimated sensor value for the failed sensor signal in the control system, as shown at signal G in FIG. 2.

In addition, if is often possible to compensate (at least partially) for an actuator calibration change. The desired input to the plant can often be achieved by varying the electrical signal to the actuator to achieve the desired plant input (e.g., elevator or rudder actuator for a flight vehicle). Although control reconfiguration is known in a limited sense in the prior art, the use of an optimal FDI for determining the magnitude of the failure and for yielding the relevant compensation is new in the present invention.

As previously noted, the dynamic system could be a model of a financial system such as the stock market. The above-described filter would monitor the financial system and alert the user(s) (i.e., owner(s), seller(s), buyer(s), etc.) of options, futures or any other kind of financial instrument whose value is based upon the inputs, outputs, and/or system parameters of a change. The system would alert the user to the change and in what part of the mathematical model the change occurred.

For the convenience of the reader, appendices A and B, provided herein below, review and summarize the theory of FDI and the design of failure detection filters as well as provide background material for understanding the theoretical concepts involved in the present invention. This theory provides support for and proof of many assertions made in the main body of the specification.

On the other hand, it should not be necessary to follow all of the discussion in these appendices to understand the invention itself or its applicability in practice.

Appendix A

Fault Detection Theory and Background Material

This Appendix contains definitions and results used throughout the application. The treatment of this material is not exhaustive.

2.1 Failure Detection and Isolation Theory

The original theoretical development of detection filters was done by Beard and Jones in the late 1960s and early 1970s. Since then, some major researchers have studied the problem:

- Chow and Willsky studied robustness issues in detection filters.
- White and Speyer reformulated the system as an eigensystem assignment problem.
- Massoumnia reformulated Beard's and Jones's work in a geometric context.
- Min and Ribbens solved the sensor failure isolation problem.
- Park and Rizzoni reformulated the problem as a decoupled observer problem.

Analytic redundancy management algorithms are developed by forming and processing failure residuals. These residuals are essentially zero if no failure has occurred and are non-zero if a failure is present. FDI filters constitute one form of an analytic redundancy management algorithm. FDI filters are linear filters with directional characteristics that can be readily associated with some known failure mode. Like all linear filters, FDI filters are model-based. Consider the open loop system model free of sensor failures, $$\dot{x} = Ax + Bu, \quad (2.1)$$

$$y = Cx + Du \quad (2.2)$$

where x is a n×1 state vector, u is a p×1 input vector, and y is a m×1 measurement vector. Assuming the system is detectable, the detection filter then has the form of linear filter $$\dot{\hat{x}} = A\hat{x} + Bu + L(y - \hat{y}), \quad (2.3)$$

$$\hat{y} = C\hat{x} + Du, \quad (2.4)$$

where $\hat{x}$ is the state estimate and L is the detection gain. If the state error is defined as $\epsilon \triangleq x - \hat{x}$, then L can be chosen such that the output error $\bar{\epsilon} = y - \hat{y}$, has certain directional properties in the presence of a failure. When there are no failures, the closed-loop system becomes $$\dot{\epsilon} = (A - LC)\epsilon. \quad (2.5)$$

The occurrence of a plant, actuator, or sensor failure can usually be modeled by a single term added to (2.1) to produce $$\dot{x} = Ax + Bu + f_i n_i, \quad (2.6)$$

$$y = Cx + Du, \quad (2.7)$$

where $f_i$ is the n×1 failure direction associated with the ith failure. $n_i$ is generally a time-varying scalar function of x(t) or u(t). For instance, a reduction in the control authority of an actuator could easily be modeled as a $-\Delta bu(t)$ term. Another common failure is a trim change in nonlinear systems where a linearized model is being used. In this case, the failure would be $B(u(t) - u_{trim})$. A priori knowledge of $n_i$ is not required, and $n_i$ is generally assumed to be an arbitrary function of time. Sometimes the magnitude of $n_i$ is estimated to gauge the severity of the failure or to attempt to distinguish between two failures that are not output separable; output separable will be defined later. Bear stated the following definition.

Definition 2.1.1 (Detection Gain)

The fault associated with $f_i$ in the system described by (2.7) is detectable if there exists a n×m matrix, L, referred to as a detection gain for $f_i$ which satisfies the following two conditions:

1. $C\epsilon$ maintains a fixed direction in the output space.
2. All eigenvalues of (A−LC) can be arbitrarily specified, up to conjugate symmetry.

This means the output direction is maintained during the transient and steady-state phase of the response due to the system failure.

Lemma 2.1.1 (Unidirectional Error Output)

Condition 1 of Definition 2.1.1, is satisfied if and only if:

$$\text{rank}[Cf_i, (A-LC)f_i, \ldots, (A-LC)^{n-1}f_i] = 1. \quad (2.8)$$

From this it is clear that $\epsilon$ lies in the controllable subspace of $f_i$, $W_{f_i}$.

$$W_{f_i} = R([f_i, (A-LC)f_i, \ldots, (A-LC)^{n-1}f_i]) \quad (2.9)$$

Lemma 2.1.2 (Output Separability)

If $$CF \triangleq [Cf_1, Cf_2, \ldots, Cf_r], \quad (2.10)$$

is rank r, then the failures are output separable. If $_{CA^jf_i} = 0$ for $j = 0, 1, \ldots, \delta-1$, then the rank of CF will be <r, but if $CA^\delta f_i \neq 0$, then all rank of CF equals r assumptions and procedures can still be used if $f_l$ is replaced everywhere by $A^\delta f_i$. Furthermore, the dynamics of the system may still allow for the detection of the failures if the output separability assumption is not satisfied because two failure directions have identical output directions. One or both of the original directions can be replaced by $A^j f_i$ for some j>0 such that rank requirement is satisfied.

The next important concept is that of the detection generator, $g_l$. It is a vector that is associated with $f_l$ and is important in the design of detection filters. It is defined in the following lemma.

Lemma 2.1.3 (Detection Space Vector)

If 1. (A, C) is an observable pair
2. rank $CW_{f_i} = 1$ where $W_{f_i}$ is defined by (2.9), then there exists an n-vector, $g_i$, in the controllable space of $f_i$ (with respect to (A−LC)) such that $$\begin{bmatrix} C \\ CA \\ \vdots \\ CA^{k-2} \end{bmatrix} g_i = 0 \qquad (2.11)$$

and $$CA^{k-1}g_i \neq 0. \qquad (2.12)$$

(2.12) guarantees that the invariant space generated by $g_i$ is of dimension k. Thus, the set of vectors $g_i, Ag_i, \ldots, A^{k-1}g_i$ form a basis for the controllable space of $f_i$. These facts yield $$[g_i(A-LC)g_i, \ldots, (A-LC)^{k-1}g_i] = [g_i, Ag_i, \ldots, A^{k-1}g_i]. \qquad (2.13)$$

Thus, $f_i$ can be expressed as:

$$f_i = \alpha_1 g_i + \alpha_2 Ag_i + \ldots + \alpha_k A^{k-1}g_i \qquad (2.14)$$

for some set of scalars $\alpha_1, \ldots, \alpha_k$. A convenient choice for $g_i$ is such that the term with the highest power of A has a coefficient of 1. In general, if for some non-negative integer $\mu$, $$CA^j f_i = 0 \text{ for } j=0, \ldots, \mu-1 \qquad (2.15)$$

$$CA^\mu f_i \neq 0 \qquad (2.16)$$

then $$\alpha_{k-j} = 0 \text{ for } j=0, \ldots, \mu-1 \qquad (2.17)$$

$$\alpha_{k-\mu} \neq 0 \qquad (2.18)$$

and let $g_i$ be taken so that $\alpha_{k-\mu} = 1$. The fact that (A, C) is observable guarantees that (2.15) and (2.16) are true for some $\mu \leq k-1$. Thus, $$f_i = \alpha_1 g_i + \alpha_2 Ag_i + \ldots + \alpha_{k-1} A^{k-2}g_i + A^{k-1}g_i \text{ if } Cf_i \neq 0 \qquad (2.19)$$

or $$f_i = \alpha_1 g_i + \alpha_2 Ag_i + \ldots + \alpha_{k-\mu-1} A^{k-\mu-2}g_i + A^{k-\mu-1}g_i \qquad (2.20)$$

Definition 2.1.2 (Detection Generator)

A vector $g_i \in R^{n \times l}$, satisfying (2.11), (2.12) and either (2.19) or (2.20) is defined to be the kth order detection generator for $f_i$.

Lemma 2.1.3 shows that there always exists a detection generator associated with a detection gain. As an example, take the following system:

$$A = \begin{bmatrix} 0 & 3 & 4 \\ 1 & 2 & 3 \\ 0 & 2 & 5 \end{bmatrix}, C = \begin{bmatrix} 0 & 1 & 0 \\ 0 & 0 & 1 \end{bmatrix}, f = \begin{bmatrix} 1 \\ -0.5 \\ 0.5 \end{bmatrix}. \qquad (2.21)$$

The detection space has dimension 1 and the detection generator is:

$$g = \begin{bmatrix} 1 \\ 0 \\ 0 \end{bmatrix}. \qquad (2.22)$$

When a detection generator exists, then it will be shown that it is possible to write a solvable equation for L, the estimator gain. Furthermore, it allows the arbitrary specification of k eigenvalues of (A–LC), where k is the order of the detection generator. Computing the detection generator will be discussed later.

Lemma 2.1.4 (Detection Gain)

If the conditions of Lemma 2.1.3 are satisfied, and the k eigenvalues of (A–LC) associated with the controllable space $f_i$ are given by the roots of:

$$s^k + p_k s^{k-1} + \ldots + p_2 s + p_1 = 0 \qquad (2.23)$$

where $p_i$ are scalars and s is a complex variable, then L must be a solution of:

$$LCA^{k-1}g_i = p_1 g_i + p_2 Ag_i + \ldots + p_k A^{k-1}g_i + A^k g_i \qquad (2.24)$$

where $g_i$ is the kth order detection generator for $f_i$. Conversely, if there exists a kth order detection generator, $g_i$, then any solution of (2.24) is a detector gain for $f_i$, and the k eigenvalues of (A–LC) will be given by the roots of (2.23).

Pre-multiplying (2.19) by C yields:

$$CA^{k-1}g = Cf_i \qquad (2.25)$$

which results in $$LCf_i = p_1 g_i + p_2 Ag_i + \ldots + p_k A^{k-1}g_i + A^k g_i \qquad (2.26)$$

as the equation for a detector gain when $Cf_i \neq 0$. If $Cf_i = 0$, then pre-multiplying by $CA^\mu$ yields:

$$CA^{k-1}g_i = CA^\mu f_i \qquad (2.27)$$

which results in $$LCA^\mu f_i = p_1 g_i + p_2 Ag_i + \ldots + p_k A^{k-1}g_i + A^k g_i \qquad (2.28)$$

for the detection gain. It can be seen that the case of $Cf_i \neq 0$ is a special case with $\mu=0$. For the following results, if $Cf_i=0$, just replace $Cf_i$ by $CA^\mu f_i$, and the results will hold. The following lemma then allows one to solve for the detection gain, L, given a detection generator, $g_i$.

Lemma 2.1.5 (Detection Gain Solution)

If D, S, and Q are matrices of dimension n×m, m×r, and n×r, respectively, where $n \geq m \geq r$ and rank$S=r$, then the general solution of DS=Q, is given by:

$$D = QS^+ + E[I - SS^+] \qquad (2.29)$$

where E is an arbitrary n×n matrix and $S^+ = (S^T S)^{-1} S^T$. $E[I-SS^+]$ represents the freedom left in D after satisfying DS=Q.

Then, a general solution for L is:

$$L = [p_1 g_i + p_2 Ag_i + \ldots + p_k A^{k-1}g_i + A^k g_i]((Cf_i)^T Cf_i)^{-1}(Cf_i)^T + L'(I - (Cf_i)((Cf_i)^T Cf_i)^{-1}(Cf_i)^T) \qquad (2.30)$$

Then for a given L $$A - LC = A - ([p_1 g_i + \ldots + A^k g_i]((Cf_i)^T Cf_i)^{-1}(Cf_i)^T)C + L'(I - (Cf_i)((Cf_i)^T Cf_i)^{-1}(Cf_i)^T)C \qquad (2.31)$$

$$= A' - L'C' \qquad (2.32)$$

where $$A' = A - [p_1 g_i + p_2 Ag_i + \ldots + p_k A^{k-1}g_i + A^k g_i]((Cf_i)^T Cf_i)^{-1}(Cf_i)^T C \qquad (2.33)$$

and $$C' = (I - (Cf_i)((Cf_i)^T Cf_i)^{-1}(Cf_i)^T)C \qquad (2.34)$$

The (A'–L'C') in (2.32) has satisfied condition 1 for the detectability of $f_i$. To completely satisfy both conditions for the detectability of $f_i$, there must be enough freedom in L' left to specify the remaining n–k eigenvalues of (A'–L'C').

Lemma 2.1.6 (Eigenvalue Placement)

If A', C', and L' are real matrices of dimension n×n, m×n, and n×m, respectively, the number of eigenvalues of [A'–L'C'] which can be arbitrarily specified by the choice of L' is equal to q', where $$q' = \text{rank} M = \text{rank} \begin{bmatrix} C' \\ C'A' \\ \vdots \\ C'A'^{m-1} \end{bmatrix} \quad (2.35)$$

Moreover, for any L', the remaining (n–q') eigenvalues of [A'–L'C'] are equal to the corresponding eigenvalues of A'.

Then, the total number of eigenvalues that can be placed with the detector gain L is k+q'. Condition 2 of definition 2.1.1, the detectability of $f_i$, will only be satisfied if k+q'=n. Since A' depends on $g_i$, it would follow that q' and M must depend on the generator $g_i$. The following lemman shows this is not the case.

Lemma 2.1.7 (Detection Gain Eigenvalue Placement)

If L is constrained to be a detector gain for $f_i$, then the number of eigenvalues of A=LC which can be arbitrarily specified, in addition to those given by (2.23), is equal to $$\text{rank} M = \text{rank} \begin{bmatrix} C' \\ C'K' \\ \vdots \\ C'K'^{m-1} \end{bmatrix} \quad (2.36)$$

where C' is defined in (2.34) and $$K' = A - Af_i((Cf_i)^T Cf_i)^{-1}(Cf_i)^T C. \quad (2.37)$$

K' and C' do not depend on $g_i$ or k. The amount of freedom left in L to place the remaining eigenvalues is always the same regardless of the choice of the detection generator. The amount of freedom depends only on (A, C). Thus, if a detection generator of order n–q' can be found, then the requirements for the detectability of $f_i$ will be satisfied.

Definition 2.1.3 (Detection Space)

The null space of M is defined to be the detection space of $f_i$, $D_f$.

Definition 2.1.4 (Completion Space $\overline{D}$)

The completion space, $\overline{D}f_i$, is the range space of M.

Definition 2.1.5 (Detection Order)

The dimension of the detection space for $f_i$ is defined to be the detection order of $f_i$.

Definition of 2.1.6 (Detection Space Generator)

A detection generator for $f_i$ whose order is equal to the detection order of $f_i$ is defined to be the maximal detection generator for $f_i$.

The reference Beard proved the following theorem.

Theorem 2.1.1 (Detection Space Generator Existence)

If (A, C) is an observable pair, then every n-vector $f_i$ has a maximal detection generator and it is unique.

Another view of the detectability of $f_i$ as previously defined is the ability to assign $f_i$ as an eigenvector of the error dynamics.

$$(A-LC)f_i = \lambda f_i \quad (2.38)$$

$$LCf_i = Af_i - \lambda f_i \quad (2.39)$$

Using Lemma 2.1.5 and equation (2.39) a solution for L is:

$$L = (Af_i - \lambda f_i)(Cf_i)^+ + E(I - (Cf_i)(Cf_i)^+). \quad (2.40)$$

The closed-loop then becomes:

$$A - LC = A - ((Af_i - \lambda f_i)(Cf_i)^+ + E(I - (Cf_i)(Cf_i)^+))C \quad (2.41)$$

$$= A - L_i C - EC_i \quad (2.42)$$

$$= A_i - EC_i \quad (2.43)$$

where $$L_i = (Af_i - \lambda f_i)(Cf_i)^+ \quad (2.44)$$

$$C_i = (I - (Cf_i)(Cf_i)^+)C \quad (2.45)$$

$$A_i = A - ((Af_i - \lambda f_i)(Cf_i)^+)C \quad (2.46)$$

This allows a more direct definition of the detection space based on just A, C, and $f_i$.

Lemma 2.1.8 (Detection Space Collinear Vectors)

Let w be an eigenvector of $A_i$. If Cw is collinear with $Cf_i$, then w is in the detection space.

Lemma 2.1.9 (Detection Space Unobservable Vectors)

For $(A_i, C_i)$, which has $v_i$ unobservable eigenvalues, let $u_1, u_2, \ldots, u_{vi}$ be the $v_i$ eigenvectors of $A_i$ associated with the observable eigenvalues. Then, $Cu_i$ is collinear with $Cf_i$.

Detection Filter Design Example

The design of a FDI for a 3×3 system with a fault vector with a one-dimensional detection space is considered to demonstrate the concepts introduced so far. This design example is the same that Beard and White used. Consider the following system, $$A = \begin{bmatrix} 0 & 3 & 4 \\ 1 & 2 & 3 \\ 0 & 2 & 5 \end{bmatrix}, C = \begin{bmatrix} 0 & 1 & 0 \\ 0 & 0 & 1 \end{bmatrix}, f = \begin{bmatrix} 1 \\ -0.5 \\ 0.5 \end{bmatrix} \quad (2.47)$$

The detection space is:

$$D_f = \begin{bmatrix} -0.816 \\ 0.408 \\ -0.408 \end{bmatrix} \quad (2.48)$$

Choosing a closed-loop pole of –8 for the detection space and using the formulas in (2.44), (2.45), and (2.46) with $f$ replaced by g results in:

$$A_i = \begin{bmatrix} 0 & 11.5 & -.45 \\ 1 & -0.5 & 5.5 \\ 0 & 7.5 & -0.5 \end{bmatrix}, C_i = \begin{bmatrix} 0 & 0.5 & 0.5 \\ 0 & 0.5 & 0.5 \end{bmatrix}, L_i = \begin{bmatrix} -8.5 & 8.5 \\ 2.5 & -2.5 \\ -5.5 & 5.5 \end{bmatrix}. \quad (2.49)$$

(2.14) states that $f$ can be replaced by $g$ without any loss of generality. The remaining eigenvalues can be adjusted using the place function in MATLAB and $A_i$ and $C_i$ for the system matrices. By choosing two additional poles, the gain returned by the place command, $L_p$, can be added to the first gain, $L_i$, to achieve the desired closed-loop properties. The final gain then becomes, $$L = L_i C + L_p C_i, \quad (2.50)$$

$$LC = \begin{bmatrix} 0 & 23 & 40 \\ 0 & 11 & 6 \\ 0 & 2 & 13 \end{bmatrix}, \quad (2.51)$$

which results in the following closed-loop system:

$$A - LC = \begin{bmatrix} 0 & -20 & -36 \\ 1 & -9 & -3 \\ 0 & 0 & -8 \end{bmatrix}, \quad (2.52)$$

with the following eigenvectors, $$V = \begin{bmatrix} 1.91 & 1.73 & 0.816 \\ 0.383 & 0.433 & -0.408 \\ 0 & 0 & 0.408 \end{bmatrix} \quad (2.53)$$

and eigenvalues $$d = \begin{bmatrix} -4 & 0 & 0 \\ 0 & -5 & 0 \\ 0 & 0 & -8 \end{bmatrix}. \quad (2.54)$$

2.2 Linear Algebra Results

Definition 2.2.1 (Ranges Spaced)

The range space of $A \in \mathbb{C}^{n \times n}$ is, $$R(A) = \{Ax : x \in X\}. \quad (2.55)$$

The $R(A)$ is the span of the columns of A. The range of $A^H \in \mathbb{C}^{n \times n}$ is $$R(A^H) = \{A^H x : x \in X\}, \quad (2.56)$$

and is also referred to as the row space of $A^H$.

Definition 2.2.2 (Null Spaces)

The null space of $A \in \mathbb{C}^{n \times n}$ is, $$N(A) = \{x : Ax = 0\}. \quad (2.57)$$

The null space of $A^H \in \mathbb{C}^{n \times n}$ is, $$N(A^H) = \{x : A^H x = 0\}, \quad (2.58)$$

and is also referred to as the left null space of A.

Definition 2.2.3 (Invariant Subspace)

The subspace X is an invariant subspace of A if $$AX \subset X. \quad (2.59)$$

Lemma 2.2.1 (Invariant Subspace Basis)

Let X be an invariant subspace of A, and let the columns of X form a basis for X. Then, there is a unique matrix L such that $$AX = XL. \quad (2.60)$$

The matrix L is the representation of A on X with respect to the basis X. In particular, $(v, \lambda)$ is an eigenpair of L if and only if $(Xv, \lambda)$ is an eigenpair of A.

Lemma 2.2.2 (Left Invariant Subspace)

The subspace X is a left invariant subspace of A if $$XA \subset X. \quad (2.61)$$

Furthermore, if the columns of X are linearly independent and the columns of Y space $R^\perp(X)$, the $R(X)$ is an invariant subspace of A if and only if $$Y^H AX = 0. \quad (2.62)$$

In this case $R(Y)$ is a left invariant subspace of A.

Definition 2.2.4 (Moore-Penrose Generalized Inverse)

Let $A \in \mathbb{C}^{n \times n}$. If A is nonsingular, then there is a unique matrix X such that $$AX = XA = I. \quad (2.63)$$

It is necessary to generalize the idea of an inverse to the case where A is singular or even fails to be square. The following four conditions are known as the Penrose conditions,

1. AXA=A,
2. XAX=X,
3. $(AX)^H = AX$,
4. $(XA)^H = XA$.

A matrix X which satisfies all four conditions is denoted $A^\dagger$, and is called the Moore-Penrose Generalized Inverse.

Theorem 2.2.1 (Projection Theorem)

For any matrix A,

1. $P_A = AA^\dagger$ is the orthogonal projector onto $R(A)$,
2. $P_{A^H} = A^\dagger A$ is the orthogonal projector onto $R(A^H)$,
3. $P_A^\perp = I - P_A$ is the orthogonal project onto $N(A)$, where $A^\dagger$ is the Moore-Penrose pseudo-inverse.

Theorem 2.2.2 (AXB=Y)

Let A be a $n_1 \times n_2$ matrix, X be a $n_2 \times n_3$ matrix, B be a $n_3 \times n_4$ matrix, and Y be a $n_1 \times n_4$ matrix. Then the following statements are equivalent:

1. The equation $$A \times B = Y \quad (2.64)$$

has a solution X.

2. A, B, and Y satisfy $$P_A Y P_{B^H} = Y. \quad (2.65)$$

3. A, B and Y satisfy $$P_A^\perp Y = 0, \quad (2.66)$$

and $$Y P_{B^H}^\perp = 0. \quad (2.67)$$

In this case, all solution are of the form $$X = A^\dagger Y B^\dagger + Z - P_A^H Z P_B, \quad (2.68)$$

where $A^\dagger$ is the Moore-Penrose pseudo-inverse and Z is an arbitrary $n_2 \times n_3$ matrix.

2.3 Linear Matrix Inequalities

Definition 2.3.1 (Linear Matrix Inequality)

A linear matrix inequality (LMI) has the form $$F(x) \triangleq F_0 + \sum_{i=1}^{m} x_i F_i > 0,$$

where $x \in R^n$ is the variable and the symmetric matrices $F_i = F_i^T \in R^{n \times n}$, i=0, . . . , m, are given.

The inequality symbol in definition 2.3.1 means that F(x) is positive definite and the LMI is a strict LMI, but if $F(x) \geq 0$ implying that F(x) is positive semidefinite then the LMI is a non-strict LMI. Certain nonlinear inequalities can be converted to a LMI form using Schur Complement.

Theorem 2.3.1 (Schur Complement)

$$\text{The } LMI, \begin{bmatrix} Q(x) & S(x) \\ S^T(x) & R(x) \end{bmatrix} > 0, \quad (2.69)$$

where $Q(x) = Q^T(x)$, $R(x) = R^T(x)$, and S(x) depend affinely on x, is equivalent to $$R(x) > 0, \; Q(x) > 0, \; Q(x) - S(x)R^{-1}(x)S^T(x) \quad (2.70)$$

As an example, the (maximum singular value) matrix norm constraint $\|Z(x)\| < 1$, where $Z(x) \in R^{p \times q}$ and depends affinely on x, can be represented as the following LMI, $$\begin{bmatrix} I & Z(x) \\ Z(x)^T & I \end{bmatrix} > 0. \quad (2.70)$$

A standard optimization problem that is encountered is:

minimize $c^T x$ subject to $F(x) > 0$.

Appendix B

Optimal Failure Detection Filters

Current FDI filter design methods are suboptimal with respect to noise. One would like FDI filter design to benefit from the almost 40 years of Linear Quadratic (LQ) optimal design. It has been extensively studied as a design methodology. The reason for such an intense study of the LQ design methodology is its ease of design and guaranteed properties such as sensitivity reduction, gain and phase margins, and transient responses. Present FDI filter design methods suffer from the lack of the many benefits that LQ design offers. It is then of great interest to see if FDI filter design can be cast as an LQ design problem and then gain the aforementioned benefits.

Using the multivariable Linear Quadratic Regulator (LQR) design methodology to obtain desired performance metrics has been extensively studied. Harvey and Stein, Stein, Kouvaritakis, and Champetier studied the asymptotic eigenstructure properties of the LQ regulator, and developed algorithms to choose the weights to obtain a desired asymptotic eigenstructure. Researchers, including Anderson and Moore, Medanic, Tharp, and Perkins, Kawasaki and Shimemura, Chilali and Gahinet, and Shieh, et al., have examined the problem of constraining the closed-loop eigenvalues to a subset of the left-hand plane.

Many properties of the LQ Estimator (LQE) follow directly because it is the dual of the LQR. The body of research dealing with the LQ estimation eigenstructure problem is surprisingly sparse. Stein looked at the asymptotic left eigenvector eigenstructure of the LQ estimation problem as the dual of the LQR problem of right eigenvector assignment, and developed an algorithm for specifying the asymptotic left eigenstructure in the LQE problem. The LQ estimation eigenstructure problem deals with assigning right eigenvectors in the LQ estimation problem and its dual, assignment of left eigenvectors in LQR. Stengel mentions that by adjusting the noise covariance matrices, one can achieve different eigenstructures. But he cites Stein's paper, in which only left eigenvectors can be specified, while the optimal Fault Detection and Isolation (FDI) problem usually requires that the right eigenstructure be specified. Douglas and Speyer have developed a left eigenvector approach to FDI filter design, but it is not clear that the methods developed herein can be combined with that particular design methodology because they require the eigenvalues associated with the left eigenvectors to be specified.

The LQ FDI problem is a specialized version of the general LQE problem. For the FDI problem, some subset of the closed-loop eigenstructure needs to be specified in order to achieve failure isolation via direction of the error residual vector in the error output space. Park attempted to solve the LQ FDI problem. He set up the problem as a minimization problem with the trace of the state covariance as the cost function, and used Lagrange multipliers to attempt to enforce the eigenstructure constraint. He obtained two coupled Riccati equations that are "virtually intractable." However, when there was just one failure to detect and the detection space was small (one- or two-dimensional), he was able to obtain a solution by iterating back and forth between the coupled equations. Unfortunately, an examination of Park's solution indicates that the robustness properties of the LQ Estimator are not necessarily preserved and thus in some situations may not be very robust to uncertainty.

The general problem of eigenstructure assignment LQE problems is analyzed herein. The dual problem of assigning eigenstructure in the LQR problem is not covered herein. A new algorithm is developed which formulates the LQE problem as an LMI optimization problem with an eigenstructure constraint. One of the advantages of this formulation is achieving the desired eigenstructure tolerance not asymptotically, but with reasonable weighting matrices that correspond to an acceptable value for the feedback gain. This new algorithm is then applied to the FDI filter design problem, resulting in FDI filters with the desired LQ robustness properties. The LMI formulation can be solved by any of a number of LMI solver packages available.

5.1 Linear Quadratic Methods, the Riccati Equation, and LMI's

In order to embed the eigenstructure constraint in the LQ optimization problem, it is necessary to cast the LQ problem as an LMI optimization problem, to do this, it is first necessary to understand the relationship between the "standard" LQ problem, involving the Algebraic Ricatti Equation (ARE), and the LQ problem cast as an LMI optimization. Once this relationship is understood, it is necessary to parameterize the feedback gain so as to ensure the desired closed-loop eigenstructure is obtained, or to add another constraint which enforces the desired eigenstructure alignment. Then, using some results from the inverse LQ problem, this constrained gain structure is embedded in the LMI optimization problem to guarantee the desired closed-loop eigenstructure.

The relationship between the "standard" LQ problem and the LMI optimization problem was first presented to the controls community by Willems. The power of LMIs is only now beginning to be noticed by the controls community. Doyle said about the usefulness of LMIs that "LMIs play the same central role in the post-modern (control) theory as Lyapunov function and Riccati equations played in the modern, and in turn, various graphical techniques such as Bode, Nyquist and Nichols plots played in the classical." In his seminal 1971 paper, Willems analyzes linear quadratic regulator problem and relates the following equations (the duals have been included for completeness), 1. The Algebraic Riccati Equation (ARE):

$$ARE: \Gamma(P) \equiv A^T P + PA + Q - PBR^{-1}B^T P, \quad (1)$$

$$\equiv AP + PA^T + W - PC^T V^{-1} CP, \quad (2)$$

2. The Quadratic Matrix Inequality (QMI):

$$A^T P + PA + Q - PBR^{-1}B^T P \geq 0, \quad (3)$$

$$AP + PA^T + W - PC^T V^{-1} CP \geq 0, \quad (4)$$

3. The Linear Matrix Inequality (LMI):

$$LMI: \Lambda(P) \equiv \begin{bmatrix} A^T P + PA + Q & PB \\ B^T P & R \end{bmatrix} \geq 0, \quad (5)$$

$$\equiv \begin{bmatrix} AP + PA^T + W & PC^T \\ CP & V \end{bmatrix} \geq 0, \quad (6)$$

Molinari expanded Willem's detailed analysis and clarified some additional aspects. An important relationship for the work in this dissertation is the relationship between the solutions of the LMI and the ARE equations.

To review this relationship consider the LQR problem, $$V(x_o) = \inf_{u \in L_{2_{e+}}} \int_0^\infty w(x, u) dt, \quad \lim_{t \to \infty} x(t) = 0, \quad (7)$$

where $$L_{2_{e+}} = f:[0, \infty) \to R^p | f(t) \in L_2(o,T), \, T \geq 0 \quad (8)$$

and x and u are subject to the dynamical constraint $$\dot{x} = Ax + Bu, \quad (9)$$

$$x(0) = x_o.$$

The analysis of this optimization problem leads to the series of matrix relations and frequency domain inequalities that were previously defined. Furthermore, consider the class of functions V: $R^n \to R$ which satisfy the dissipation inequality (DIE)

$$\int_{t_0}^{t_1} w(x, u) dt + V(x_1) \geq V(x_0) \quad (10)$$

for all $t_1 \geq t_0$ and x and u satisfying (9) and $x(t_1) = x_1$. In differential form, (10) becomes $$\nabla_x V(x)(\dot{x}) \geq -w(x, u) \quad (11)$$

with $\dot{x} = Ax + Bu$. For quadratic functions of the form, $$w(x, u) = [x^T \; u^T] \begin{bmatrix} Q & 0 \\ 0 & R \end{bmatrix} \begin{bmatrix} x \\ u \end{bmatrix} \quad (12)$$

and $R = R^T > 0$ and $Q = Q^T \geq 0$, the DIE is equivalent to the QMI and, using Schur's complement from Theorem 2.3.1 of Appendix A, to the LMI. One can obtain a lower bound on the cost, V, in (7) utilizing LMIs. Suppose the quadratic function $x^T P x$ with P>0 satisfies $$\frac{d}{dt}(x^T P x) \geq -(x^T Q x + u^T R u) \quad (13)$$

for all $t \geq 0$ and for all x and u satisfying the dynamical constraint (9). Integrating both sides from 0 to T, one gets:

$$x_0^T P x_0 \leq \int_0^T x^T Q x + u^T R u \, dt, \quad (14)$$

which is a lower bound for $V_{optimal}$. Using Schur's complement from Theorem 2.3.1 of Appendix A, another way to write (13) is as the LMI:

$$\begin{bmatrix} A^T P + PA + Q & PB \\ B^T P & R \end{bmatrix} \geq 0. \quad (15)$$

Using these facts and expanding on Willem's analysis, Molinari showed that the maximal and minimal solutions to the ARE, $P_+$ and $P_-$, are also the maximal and minimal solutions to the LMI, thus allowing the solution of the LQR problem to be cast as the following LMI optimization problem, $$\max x_0^T P x_0 \text{ subject to } P > 0, \begin{bmatrix} A^T P + PA + Q & PB \\ B^T P & R \end{bmatrix} \geq 0, \quad (16)$$

for which fast and numerically stable algorithms have been developed in the past 15 years. The optimization variable is the symmetric matrix P. Using duality, one can also obtain a least upper bound on the optimal cost, $V_{optimal}$. Consider the system (9) with a constant, linear state feedback u=Kx that stabilizes the system:

$$\dot{x} = (A+BK)x, \quad x(0) = x_0, \quad (17)$$

with A+BK stable. Then, the cost function reduces to $$V(x_0) = \inf_{u \in L_{2e+}} \int_0^\infty x^T (Q + K^T R K) x \, dt. \quad (18)$$

From standard results, V can be evaluated as $$\text{Tr} Z(Q + K^{TRK}), \quad (19)$$

where Z satisfies $$(A+BK)Z+Z(A+BK)^T+x_0x_0^T=0, \quad (20)$$

with $A+BK$ stable. Thus, the least upper bound on $V_{optimal}$, using state-feedback control, can be computed as the solution to the optimization problem with the optimization variables Z and K:

$$\min \, TrZ(Q+K^TRK),$$

subject to $$Z>0, (A+BK)Z+Z(A+BK)^T+x_0x_0^T \leq 0, \quad (21)$$

The dual of the LQR problem is the LQE problem. Consider the system $$\dot{x}=Ax+Bu+Gw, \quad (22)$$

$$y=Cx+v, \quad (23)$$

where $w(t)$ is white noise with intensity W, $v(t)$ is white noise with intensity V, and $w(t)$ and $v(t)$ are uncorrelated. The LQ estimator has the associated Algebraic Riccati Equation:

$$AP+PA^T+GWG^T-PC^TV^{-1}CP=0. \quad (24)$$

The optimal observer is:

$$\dot{\hat{x}}=A\hat{x}+Bu+L(y-C\hat{x}), \quad (25)$$

where $$L=PC^TV^{-1}. \quad (26)$$

The ARE associated with the LQ estimator problem can be turned into the following LMI:

$$LMI: \Lambda(P) \equiv \begin{bmatrix} AP+PA^T+GWG^T & PC^T \\ CP & V \end{bmatrix} \geq 0. \quad (27)$$

The benefits of formulating the LQ problem as an LMI, which were pointed out in Appendix A, could not be realized until relatively recently. Within the last 5 to 10 years, the efficient numerical algorithms for solving LMIs developed in the early to mid-1980s were coded and released to the general research audience. Research into LMI solvers and improvements to the LMI solver codes will continue to make this formulation even more attractive in the future. The three main advantages to casting the LQ problems as LMI optimizations are, 1. The optimization problem can be solved in polynomial-time,
2. The optimization problem can be solved in practice very efficiently, and
3. Feasible linear constraints and feasible nonlinear constraints of a special form (using Schur's complement) can easily be added to the optimization problem.

5.2 Least Squares LMI LQE Eigenstructure Assignment

The goal is to develop an algorithm using LMIs to obtain a solution that is optimal for some P, $GWG^T$, and V thus preserving the attractive robustness properties of the LQ estimator and at the same time align the eigenstructure in some desired manner. Additionally, we would like to achieve this with the closed-loop poles in a "reasonable" region of the left-hand plane.

An analysis of the observer return difference equation helps to understand the constraints associated with attempting to align the closed-loop eigenstructure in a specified manner. The return difference equation for the LQ estimator is $$T(s)VT^T(-s)=V+C(sI-A)^{-1}GWG^T(-sI-A^T)^{-1}C^T. \quad (28)$$

Eigenvectors of this equation are the closed-loop eigenvectors of the system. Thus, the choice of G, W, and V determine the closed-loop eigenstructure. Perfect eigenstructure alignment is not necessary in the real world. A simple bound on the error in the eigenstructure alignment would be sufficient for any realistic application. Given a desired set of eigenvectors (or detection space), $X_{cl}$, and their unknown (will be determined later) associated eigenvalues, $\lambda$, a least square representation of this alignment constraint is:

$$\varepsilon > \|(\lambda I - A + PC^TV^{-1}C)X_{cl}\|_2^2. \quad (29)$$

The bound $\in$ is a free parameter chosen by the designer. It can be viewed as a weight on how tight the actual eigenstructure alignment has to be which is determined by the post-processing performance requirements. A very small $\in$ essentially aligns the eigenstructure exactly. The constraint can be turned into an LMI using Schur's complement and has the form:

$$\begin{bmatrix} \varepsilon I & ((\lambda I - A + PC^TV^{-1}C)X_{cl})^T \\ (\lambda I - A + PC^TV^{-1}C)X_{cl} & I \end{bmatrix} > 0. \quad (30)$$

The value of $\in$ needed to obtain a prescribed level of alignment is dependent on the closed-loop eigenvalues associated with the desired closed-loop eigenvectors. This is because the closed-loop eigenvalues scale the misalignment error. If the choice of $\in$ results in an alignment that does not meet the required alignment tolerance, a lower value can always be chosen and the optimization problem rerun. Because $V^{-1}$ appears in (30), the choice of V is fixed. Also, G appears quadratically, so it is fixed. However, W is still free and if there is sufficient freedom in the choice of W, then the desired eigenvectors can be assigned.

In addition to the eigenstructure alignment, it is important that the estimator does not have poles that are too fast and track the noise inherent in any physical system. Additionally, this constraint will be a primary factor in determining the Butterworth pattern that the non-finite closed-loop modes take. This constraint draws on a result from Chilali and Gahinet.

Definition 5.2.1 D-Stable System

A system $\dot{x}=Ax$ is called D-Stable if all its poles line in D.

Definition 5.2.2 LMI Regions

A subset D of the complex plane is called an LMI region if there exists a symmetric matrix $\alpha \in \mathbb{R}^{m \times m}$ and a matrix $\beta \in \mathbb{R}^{m \times m}$ such that $$D=\{z \in \mathbb{C}: f_D<0\}, \quad (31)$$

with $$f_D:=\alpha+z\beta+\bar{z}\beta^T \quad (32)$$

Theorem 5.2.1. D-Stable LMI Constraint

The matrix A is D-stable if and only if there exists a symmetric matrices P, $\alpha$, and $\beta$ such that $$M_D(A,P):=\alpha \otimes P+\beta \otimes (AP)+\beta^T \otimes (AP)^T, \quad (33)$$

$$M_D(A,P)<0, P>0. \quad (34)$$

To illustrate the implications of this property, consider the vertical strip defined by:

$$D=(\sigma+jw \in \mathbb{C}:-h<\sigma<0) \quad (35)$$

$$A^T P+PA+2hP>0 \quad (36)$$

Applying this condition and using Schur's complement results in the following LMI:

$$\begin{bmatrix} AP+PA^T+2hP & PC^T \\ CP & 1/2V \end{bmatrix} > 0. \quad (37)$$

This LMI constraint allows the engineer to specify a bound on the fast poles of the closed-loop system.

The variables, V and W in (28) specify the LQ estimator closed-loop eigenstructure. From (30) it is clear that to preserve the problem as a linear optimization problem, V and G must be fixed. Fortunately, W can still be matrix variable and preserve the problem as a linear optimization problem. Additionally, all the choice of G accomplishes is to determine the null space of the $GWG^T$ matrix. In the estimator problem, the null space of this matrix specifies the directions of the finite zeros of the observers. The poles of the estimator associated with the range space of $GWG^T$ will head off in a yet undetermined Butterworth pattern. This Butterworth pattern will be determined by the matrix variable W which is found by the solution of the optimization problem.

This does bring to light a shortcoming of the proposed algorithm. The constraints must be given as strict, not non-strict, inequalities. By specifying G, the rank of $GWG^T$ is predetermined. The LMI solver algorithms all work with strict inequality, because finding the rank of a matrix is not a well defined problem. If this were not the case, then a new matrix variable $\tilde{Q}=GWG^T$ could be introduced and the optimization algorithm could determine the optimal range of Q. When computing the solutions, the strict inequalities are essentially the same as non-strict ones to machine precision, but many of the theoretical results rely on (the greater than or equal) inequality instead of the strict inequality. The LMI solvers will view a matrix with an eigenvalue of $\lambda_i \approx 10^{-15}$ as >0, but for all practical purposes the matrix is $\geq 0$. In order to do this, W can be allowed to be a free variable, but G must be chosen. The choice of G determines the range of $GWG^T$ since W is constrained to be full rank. The resulting LMI is:

$$\begin{bmatrix} AP+PA^T+GWG^T & PC^T \\ CP & V \end{bmatrix} \geq 0, \quad (38)$$

where the variables are now P, W, and the $\lambda$ in (29) is the pole associated with the desired eigenspace. This is now a FDI filter design problem and the desired eigenspace, $X_{cl}$, is the detection space.

Theorem 5.2.2. Least Squares Optimal Detection Filter

Given the system:

$$\dot{x}=Ax+Bu+Gw, \quad (39)$$

$$y=Cx+v, \quad (40)$$

$$x(0)=x_0.$$

and assuming (A,G) stabilizable and (A,C) detectable, then the maximal solution to the LMI optimization problem in the variables $P=P^T>0$, $W=W^T>0$, and $-h<\lambda<0$, is:

$$\max x_0^T P x_0, \quad (41)$$

subject to $$\begin{bmatrix} AP+PA^T+GWG^T & PC^T \\ CP & V \end{bmatrix} \geq 0, \quad (42)$$

$$\begin{bmatrix} AP+PA^T+2hP & PC^T \\ CP & 1/2V \end{bmatrix} > 0. \quad (43)$$

$$\begin{bmatrix} \varepsilon I & ((\lambda I-A+PC^T V^{-1} C)X_{cl})^T \\ (\lambda I-A+PC^T V^{-1} C)X_{cl} & I \end{bmatrix} > 0. \quad (44)$$

A solution with all the standard robustness properties to the asymptotically stable time-invariant Linear Quadratic Estimator problem with eigenvector alignment within $\in$ of the desired eigenvectors $X_{cl}$ and poles at most h distance into the left-half plane.

Proof

From (13) it is clear that solutions to (41) are defined by (42). The dual of (42) is (15). Now assume $v=\xi^T P_* \xi$, where $P_*$ satisfies (15). Using the relations (10) through (14) it follows that:

$$0 = \inf_{u_{[a,b]}} \int_a^b [x^T u^T] \begin{bmatrix} A^T P+PA^T+H^T WH & PB \\ B^T P & R \end{bmatrix} \begin{bmatrix} x \\ u \end{bmatrix} dt, \forall x(a) \quad (45)$$

Now define $$K_* = R^{-1} B^T P, \quad (46)$$

$$A_* = A - BK_*, \quad (47)$$

then using (2) and (5) and the identity $$\Lambda(P_*) = \begin{bmatrix} I & 0 \\ K_* & I \end{bmatrix} \begin{bmatrix} \Gamma(P_*) & 0 \\ 0 & R \end{bmatrix} \begin{bmatrix} I & 0 \\ K_* & I \end{bmatrix}, \quad (48)$$

one obtains $$0 = \inf_{u_{[a,b]}} \int_a^b \|Lx\|^2 + \|R^{1/2} v\|^2 \, dt, \text{ for all } x(a), \quad (49)$$

where $\Gamma(P_*)=L^T L$ and the feedback law is $v=K_* x+u$. This is the standard nonsingular LQR problem, and it achieves its infimum over the space of continuous functions. Immediately $v^0=0$ and $Lx^0=0$. Since this is true for all $x(\alpha)$, then $L\equiv 0$. Thus, the solution to the optimization problem (41) is also a solution to:

$$ARE:\Gamma(P)=0. \tag{50}$$

It follows by duality that the solution to (41) is also a solution to the estimator ARE, $$ARE:\Gamma(P)=AP+PA^T+GWG^T-PC^TV^{-1}CP=0. \tag{51}$$

Furthermore, the solution to (41) as solutions to the ARE also have all the attractive robustness properties of the nominal LQE. However, the solutions of (41) also satisfy the other constraints, (43) and (44), ensuring that the desired eigenstructure is aligned to within $\epsilon$ and all the closed-loop poles are at most h into the left-half plane.

The detectability requirement ensures that the closed-loop system is asymptotically stable. If an unstable mode does not show up in the cost of the optimization problem, there is no guarantee of stability. In certain cases, such as when the system is asymptotically stable to begin with, or with a modification to the optimization problem, the detectability requirement can be dropped. Using duality and the detailed analysis given in Zhou and Doyle for what they term the "extended LQR" problem explains when these requirements can be dropped. Anderson and Moore give a clear explanation of the detectability requirement as applied to the ARE. The robustness properties also follow from the fact that the LMI solutions are solutions to the ARE. Starting with the ARE $$AP+PA^T-LVL^T+GWG^T=0. \tag{52}$$

Then add and subtract $sP$ to both sides to get $$-(sI-A)P-P(-sI-A^T)-LVL^T+GWG^T=0. \tag{53}$$

Then multiply from the left by $C(sI-A)^{-1}$ and from the right by $(-sI-A^T)^{-1}C^T$ to get $$-CP(-sI-A^T)^{-1}C^T - C(sI-A)^{-1}PC^T - \tag{54}$$
$$C(sI-A)^{-1}LVL^T(-sI-A^T)^{-1}C^T +$$
$$C(sI-A)^{-1}GWG^T(-sI-A^T)^{-1}C^T = 0.$$

Using the fact that $L=-PC^TV^{-1}$ then $$VL^T(-sI-A^T)^{-1}C^T + C(sI-A)^{-1}LV - \tag{55}$$
$$C(sI-A)^{-1}LVL^T(-sI-A^T)^{-1}C^T +$$
$$C(sI-A)^{-1}GWG^T(-sI-A^T)^{-1}C^T - 0.$$

Completing the square results in $$V + C(sI-A)^{-1}GWG^T(-sI-A^T)^{-1}C^T = \tag{56}$$
$$(I - C(sI-A)^{-1}L)V(I - L^T(-sI-A^T)^{-1}C^T),$$

thus $$(I-C(sI-A)^{-1}L)V(I-L^T(-sI-A^T)^{-1}C^T)\geq I. \tag{57}$$

The ability to preserver the robustness properties $\bar{\sigma}\|S(jw)\|\leq 1$, of the LQ Estimator is an important aspect of the new design method. For the first time, it allows the design of detection filters with guaranteed robust properties.

5.3 Direct Optimal Detection Filter Design

Stein developed an LQ filter design algorithm for closed-loop asymptotic eigenstructure alignment. It required the designer to specify left eigenvectors and eigenvalues for the closed-loop estimator. Unfortunately, this is not the design problem that needs to be solved for detection filters. Returning to the LQ Estimator problem, in equation (2.40) of Appendix A the estimator feedback was parameterized as function of the desired closed eigenstructure, $X_{cl}$ and the associated eigenvalues, and the free gain matrix, E.

By specifying the closed-loop eigenvalues, though, the designer is not making use of all the flexibility offered by multivariable feedback. However, the desired eigenvector alignment does impose structural constraints on the feedback gain. One can look at the structural constraints placed on the estimator feedback gain when attempting to specify some part of the closed-loop eigenstructure. Consider a subspace, $X_{cl} \in R^p$, that a designer would like to specify as part of the closed-loop eigenstructure. To be even more strict, the designer would like any one-dimensional subspace of $X_{cl} \in R^p$ to be part of the closed-loop eigenstructure. In the case of an FDI filter design, this would ensure the detection spaces are closed-loop eigenvectors. Thus, each of the nx1 column vectors in $X_{cl}$ are closed-loop eigenvectors of the system. The set of equations, $$LN=M, \tag{58}$$

$$M \triangleq AX_{cl}-X_{cl}S_{cl}, \tag{59}$$

$$N \triangleq CX_{cl}, \tag{60}$$

$$S_{cl}=diag(\lambda_1, \lambda_2, \ldots, \lambda_p). \tag{61}$$

describe the constraints on the estimator feedback gain. Specifically, in the FDI filter problem, $X_{cl}$ is the desired detection space. The solution of (58) for the state estimator gain L will be referred to as the State Estimator Gain (SEG) problem. The SEG structural constraints arise due to Theorem 2.2.2 of Appendix A. The solution to the SEG equation is:

$$L=MN^\dagger+ZP_N^\perp. \tag{62}$$

(2.67) in Appendix A requires that $$M(I-N^\dagger N)=0, \tag{63}$$

$$(AX_{cl}-X_{cl}S_{cl})(I-N^\dagger N))=0, \tag{64}$$

$$I-N^\dagger N=0, \tag{65}$$

thus (2.67) in Appendix A is easily satisfied, since $N^\dagger N=I$. (2.65) in Appendix A imposes the last constraint $$MN^\dagger N=M \tag{66}$$

$$MI=M, \tag{67}$$

and is easily satisfied. An advantage of the new parameterization is that $S_{cl}$ can potentially take another form. If the sub-partitions of $S_{cl}$ take the form, $$S_{cl} = \begin{bmatrix} Real(\lambda) & -Imag(\lambda) \\ Imag(\lambda) & Real(\lambda) \end{bmatrix}, \tag{68}$$

then the subset of the subspace $X_{cl}$ associated with that particular sub=partition of $S_{cl}$ is a pair of complex conjugate eigenvalues. An advantage of this is that in some cases the restriction that eigenvalues associated with $X_{cl}$ be real may eliminate an important degree of design freedom. Already some degree of design freedom have been eliminated because of the eigenvector constraint. In some cases, associating a pair of complex conjugate eigenvalues with the desired subspace $X_{cl}$ may result in a better design. The SEG parameterization can then be written as:

$$L = AX_{cl}((CX_{cl})^T(CX_{cl}))^{-1}(CX_{cl})^T + \quad (69)$$
$$X_{cl}S_{cl}((CX_{cl})^T(CX_{cl}))^{-1}(CX_{cl})^T +$$
$$E(I - (CX_{cl})((CX_{cl})^T(CX_{cl}))^{-1}(CX_{cl})^T)$$

$$= L_0 + X_{cl}L_jC_p + L_kC_p^\perp \quad (70)$$

$$L_0 \triangleq AX_{cl}((CX_{cl})^T(CX_{cl}))^{-1}(CX_{cl})^T, \quad (71)$$

$$L_j \triangleq S_{cl}, \quad (72)$$

$$L_k \triangleq E, \quad (73)$$

where $E \in R^{m \times n}$ is an m×n arbitrary matrix. An analysis of this gain parameterization shows that the $L_0$ gain sets up part of the closed-loop system, $A-L_0C$, to have the desired eigenvectors and eigenvalues of 0. The $L_j$ diagonal matrix sets the eigenvalues in the desired eigenspace (or the detection space, in FDI theory). The $L_k$ matrix determines the eigenstructure in the remaining unspecified closed-loop subspace (or the completion space, in FDI theory). This parameterization is similar to Park's parameterizations, but is derived differently.

Given a parameterized gain, can one say anything about the parameterization of the solution of the LMI? This is a different form of the inverse optimal control question. The inverse multivariable optimal control problem, first thoroughly analyzed by Anderson and elaborated on by Molinari, asks whether, given a stabilizing gain, K, there is a non-negative matrix P and an associated family of Q's and R's that give that answer as a solution to the LQR problem. This is essentially a subset of what we have. We would like to know whether, given a parameterized estimator gain L, we can obtain a parameterized family of P, W's and V's where that parameterized L is a solution to the LQ estimation problem.

If one assumes V=I, then the solution P can be parameterized by the set of free parameters in the gain matrix plus an additional set of free parameters. Given this parameterization of the solution, P, there is an equation that places a restriction on the choice of W. The following analysis borrows heavily from Molinari and the fact that the LQ regulator problem and the LQ estimator problems are duals as far as stability and eigenvalue placement.

Theorem 5.3.1. Inverse LQ Estimator Problem

Assume that (A, C) is detectable and (A, $\tilde{Q}^{1/2}$) stabilizable, where $\tilde{Q}=GWG^T$. Then L is optimal for $\tilde{Q}$ if and only if 1. $Re\lambda(A-LC)<0$ and $X_{cl}$ is part of the set of closed-loop eigenvectors.
2. $L=PC^T=L_0+X_{cl}L_jC_p+L_k C_p^\perp$ for some real symmetric $P \geq 0$,
3. $AP+PA^T-L^TL+\tilde{Q}=0$,
4. CL is a symmetric matrix, where P is a function of the gain L and an arbitrary matrix $S \in R^{(n-m)\times(n-m)}$ and is $$P = Z\begin{bmatrix} YCLY^T & Y^TD_2^T \\ D_2Y & S^{(n-m)\times(n-m)} \end{bmatrix}Z^T, \quad (74)$$

$$C=Y^{-1}[I0]Z^{-1}, \quad (75)$$

$$Z^{-1}L=\begin{bmatrix} D_1 \\ D_2 \end{bmatrix}, \quad (76)$$

$$L=L_0+X_{cl}L_jC_p+L_kC_p^\perp. \quad (77)$$

Proof

Assume that the LQ estimator problem has an optimal solution for (A, C, $\tilde{Q}$). Then there exists a real symmetric matrix $\hat{P}$ such that $$A\hat{P}+\hat{P}A-\hat{P}C^TC\hat{P}+\tilde{Q}=0, \quad (78)$$

$$Re\lambda(A-LC)<0, \quad (79)$$

$$L=\hat{P}C^T. \quad (80)$$

Thus, conditions (1)–(3) are satisfied by $\hat{P}$. Conversely, should (1)–(3) hold, then clearly P is a real symmetric solution of the ARE satisfying $Re\lambda(A-LC)<0$. Of necessity, this P is unique, and can be denoted $\hat{P}$. Thus, L is optimal for $\tilde{Q}$. Given (1)–(3), hence an optimal L, then (4) follows from the fact that $CL=CPC^T$ for a symmetric P. Conversely, C admits the representation $$C=Y^{-1}[I0]Z^{-1}, \quad (81)$$

where Y and Z are non-singular. Next, consider the partitioned matrix $$Z^{-1}L=\begin{bmatrix} D_1 \\ D_2 \end{bmatrix}, \quad (82)$$

then $$D_1=YCL. \quad (83)$$

Thus, for an arbitrary symmetric matrix $S^{(n-m)\times(n-m)}$, $$P = Z\begin{bmatrix} YCLY^T & Y^TD_2^T \\ D_2Y & S^{(n-m)\times(n-m)} \end{bmatrix}Z^T. \quad (84)$$

From this (1) and (2) are satisfied and L is optimal for the $\tilde{Q}$ which is the solution to (3).

Using this theorem, an LMI optimization problem that solves the LQ estimator with eigenstructure alignment problem can now be posed. Th variables are the gain matrices, $L_j$ and $L_k$, the arbitrary positive definite symmetric matrix S, and positive definite symmetric matrix W.

Theorem 5.3.2. Direct Optimal Detection Filter

Given the system $$\dot{x}=Ax+Bu+Gw, \quad (85)$$

$$y=Cx+v, \quad (86)$$

$$x(0)=x_0, \quad (87)$$

and assume that (A, C) is detectable and (A, G) stabilizable.

$$\max x_0^T P x_0, \tag{88}$$

subject to $$\begin{bmatrix} AP + PA^T + GWG^T & PC^T \\ CP & I \end{bmatrix} \geq 0, \tag{89}$$

$$\begin{bmatrix} AP + PA^T + 2hP & PC^T \\ CP & 1/2I \end{bmatrix} > 0, \tag{90}$$

$$P = Z \begin{bmatrix} YCLY^T & Y^T D_2^T \\ D_2 Y & S^{(n-m) \times (n-m)} \end{bmatrix} Z^T, \tag{91}$$

$$L = L_o X_c L_j C_p + L_k C_p^{\perp} \tag{92}$$

$$C = Y^{-1} [I \; 0] Z^{-1}, Z^{-1} L = \begin{bmatrix} D_1 \\ D_2 \end{bmatrix}, \tag{93}$$

$$P = P^T > 0, W = W^T > 0, \text{ and } S = S^T > 0. \tag{94}$$

Proof

Using duality and Theorem 5.2.2, the solution to (88) is also a solution to the ARE. Thus, using the same arguments as in Theorem 5.2.2, the solution to (88) has all the attractive robustness properties of the nominal Linear Quadratic Estimator in addition to having no poles more than h into the left-half plane, and has $X_{cl}$ as part of the set of closed-loop eigenvectors.

The main disadvantage of the direct method is the V=I assumption. The feedback gain parameterization and P matrix parameterization guarantee that the closed-loop system has the desired eigenstructure. However, one could also find a solution to the Optimal Detection Filter optimization problem by using the least squares approach used in Theorem 5.2.2. The requirement that V=I can then be relaxed to $V = V^T > 0$ for the least squares method.

In many situations, these two optimizations problems return identical answers. However, they seem to perform differently under different constraint conditions. Condition 3 of theorem 5.3.2 clearly indicates that the choice of G puts significant restrictions on the freedom in W. When the row rank of G is lower, i.e., the number of outputs few, the latter least squares optimization problem returns a solution that is better. The term "better" applies as follows: The LMI solver exits on a number of conditions, including when it cannot get any closer to a feasible solution. In this case, a check of the sensitivity function's singular values will indicate the solution does not satisfy the LMI associated with the Riccati equation. Also, a check of the closed-loop eigenvectors may indicate the alignment exceeded the tolerance ∈. Generally, if the LMI fails to converge, then it is necessary to check these two things in addition to the general closed-loop stability (the locations of closed-loop eigenvalues) to see what the solution is. When the number of outputs is sufficient, the "structured gain" LMI optimization approach works better to reduce the fast pole location bound. Also, the parameterized gain approach always has the desired eigenstructure. The best results are obtained when both optimization problems work. This gives some guidance on the choice of G and the "reasonable" choice of the fast pole constraint value h. Using the LMI solver package written by E. Ghaoui et al. and the SDPPACK solver, the Twin Otter Estimation with eigenstructure alignment was solved. In this case, the "least-squares" method returned an alignment error of 1.3°. The parameterized method exactly assigned the desired eigenvector. The different values for the trace of P differed by only 0.04, and the eigenvalues were also essentially the same. Finally, the attractive robustness properties were preserved in that with both solutions the sensitivity functions never exceeded 1.

Appendix C

Bibliography for Appendices A and B

Advanced General Aviation Transport Experiments. NASA Glenn Research Center Web Page.

"FAA Gets Main Blame for Comair Crash." CINCINNATI ENQUIRER, Aug. 28, 1998.

P. M. Render, L. R. Jenkinson, "Investigation Into Ice Detection Parameters for Turboprop Aircraft." JOURNAL OF AIRCRAFT, 33(1):125–429, January–February 1996.

Richard Beard, "Failure Accommodation in Linear Systems Through Self-Reorganization." PhD thesis, MIT, 1971.

A. S. Willsky, "A Survey of Design Methods for Failure Detection in Dynamics Systems." AUTOMATICA, 12:601–611, 1976.

Harold Jones, "Failure Detection in Linear Systems." PhD thesis, MIT, 1973.

Janos J. Gertler, "Fault Detection and Diagnosis in Engineering Systems." Marcel Dekker, 1998.

Mohammad-Ali Massoumnia, "A Geometric Approach to Failure Detection and Identification in Linear Systems." PhD thesis, MIT, 1986.

Paul S. Min, "Detection of Incipient Failures in Dynamics Systems." PhD thesis University of Michigan, 1987.

Robert Riggins, "Detection and Isolation of Plant Failures in Dynamic Systems." PhD thesis, University of Michigan, 1991.

Jaehong Park, "A Unified Theory of Fault Detection and Isolation in Dynamics Systems." PhD thesis, University of Michigan, 1991.

IFAC World Congress. "Parameter Identification for Inflight Detection of Aircraft Icing." July 1999.

E. Y. Chow and A. S. Willsky, "Analytical Redundancy and the Design of Robust Failure Detection Systems." IEEE TRANSACTION ON AUTOMATIC CONTROL, AC-9:603–614, July 1984.

John E. White and Jason L. Speyer, "Detection Filter Design: Spectral Theory and Algorithms." IEEE TRANSACTION ON AUTOMATIC CONTROL, AC-32(7), July 1987.

Jaehong Park and Giorgio Rizzoni, "A New Interpretation of the Fault Detection Filter Part 1. Closed-form Algorithm." INTERNATIONAL JOURNAL OF CONTROL, 60(5): 767–787, 1994.

"Matrix Perturbation Theory." Computer Science and Scientific Computing. ACADEMIC PRESS, 1990.

R. E. Skelton, T. Iwasaki, and K. Grigoriadis, "A Unified Algebraic Approach to Linear Control Design." Taylor and Francis, 1998.

Stephen Boyd, Laurent El Ghaoui, Eric Feron, Venkataramanan Balakrishnan, "Linear Matrix Inequalities in System and Control Theory." Volume 15 of SIAM STUDIES IN APPLIED MATHEMATICS, SIAM, 1994.

Roger A. Horn and Charles R. Johnson, "Matrix Analysis." CAMBRIDGE UNIVERSITY PRESS, 1985.

R. M. Howe, "Airframe Equations of Motion and Transfer Operators." AE571 Class notes.

B. G. Powers, "Analytical Study of Ride Smoothing Benefits of Control System Configurations Optimized for Pilot Handling Qualities." TECHNICAL REPORT NASA-TP1148, NASA, February 1978.

R. K. Heffley, R. L. Stapleford, and R. C. Rumold, "Airworthiness Criteria Development for Powered-lift Aircraft." TECHNICAL REPORT NASA-CR-2791, NASA, February 1977.

G. J. Hancock, "An Introduction to the Flight Dynamics of Rigid Airplanes." Ellis Horwood, 1995.

T. P. Ratvasky and R. J. Ranaudo, "Icing Effects on the Aircraft Stability and Control Determined from Flight Data." TECHNICAL REPORT 105977, NASA, 1993.

Eugene Morelli, Vladislav Klein, "Optimal Input Design for Aircraft Parameter Estimation Using Dynamic Programming Principles." In AIAA ATMOSPHERIC FLIGHT MECHANICS CONFERENCE, Number 90-2801, AIAA, August 1990.

Vladislav Klein, James G. Batterson, and Patrick C. Murphy, "Determination of Airplane Model Structure from Flight Data using Modified Stepwise Regression." TECHNICAL REPORT 1916, NASA, 1981.

E. A. Morelli and V. Klein, "Accuracy of Aerodynamic Model Parameters Estimated from Flight Test Data. " JOURNAL OF GUIDANCE, CONTROL, AND DYNAMICS, 20(1):74-80, January February 1997.

Eugene A. Morelli, "Global Nonlinear Aerodynamic Modeling Using Multivariate Orthogonal Functions." JOURNAL OF AIRCRAFT, 32(2):270-277, March-April 1995.

A. R. Barron, "Self-Organizing Methods in Modeling," Chapter "Predicted Squared Error: A Criterion for Automatic Model Selection," pages 87-104. Marcel Dekker New York, 1984.

Charles A. Harvey and Gunter Stein, "Quadratic Weights for Asymptotic Regulator Properties." IEEE TRANSACTIONS ON AUTOMATIC CONTROL, AC-23(3): 378-387, June 1978.

Gunter Stein, "Quadratic Weights for Asymptotic Regulator Properties." IEEE TRANSACTIONS ON AUTOMATIC CONTROL, AC-24(4):559-566, August 1979.

B. Kouvaritakis, "The Optimal Root Loci of Linear Multivariable Systems." INTERNATIONAL JOURNAL OF CONTROL, 28(1):33-62, 1978.

Calixte Champetier, "A Duality Principle for Asymptotic Regulator Properties." INTERNATIONAL JOURNAL OF CONTROL, 38(3):547-556, 1983.

B. D. O. Anderson and J. B. Moore, "Linear System Optimization with a Prescribed Degree of Stability." PROCEEDINGS OF IEEE, 116:2083-2085, December 1969.

J. Medanic, H. S. Tharp, and W. R. Perkins, "Pole Placement by Performance Criterion Modification. IEEE TRANSACTIONS ON AUTOMATIC CONTROL, 33(5): 469-472, May 1988.

Naoya Kawasaki and Etsujiro Shimemura, "Pole Placement in a Specified Region Based on a Linear Quadratic Regulator." INTERNATIONAL JOURNAL OF CONTROL, 48(1):225-240, 1988.

Mahmoud Chilali and Pascal Gahinet. "H∞ Design with Pole Placement Constraints: An LMI Approach." IEEE TRANSACTIONS ON AUTOMATIC CONTROL, AC41(3):358-367, March 1996.

Hani M. Dib, Leang S. Shieh and Bayliss C. McInnis, "Linear Quadratic Regulators with Eigenvalue Placement in a Vertical Strip." IEEE TRANSACTIONS ON AUTOMATIC CONTROL, AC-31(3):241-243, March 1986.

Gunter Stein, "Asymptotic Eigenstructure of Filters." in CONFERENCE ON DECISION AND CONTROL, pages 297-301. IEEE, 1979.

Robert F. Stengel, "Optimal Control and Estimation." Dover, 1994.

Randal K. Douglas and Jason L. Speyer, "Robust Detection Filter Design." JOURNAL OF GUIDANCE, CONTROL, AND DYNAMICS, 19(1):214-218, 1996.

Laurent El Ghaoui and Silviu-Iulian Niculescu, Editor, "Advances in Linear Matrix Inequality Methods in Control." SIAM, 1999.

Jan C. Willems, "Least Squares Stationary Optimal Control and the Algebraic Riccati Equation." IEEE TRANSACTIONS ON AUTOMATIC CONTROL, AC-16(6): 621-634, December 1971.

J. C. Doyle, A. Packard, and K. Zhou, "Review of LFT's, LMI's, and $\mu$." In PROCEEDINGS IEEE CONFERENCE ON DECISION AND CONTROL, Volume 2, Brighton, December 1991.

B. P. Molinari, "The Time-Invariant Linear-Quadratic Optimal Control Problem." Automatica, 13:347-357, 1977.

V. Balakrishnan and L. Vandenberghe, "Connections Between Duality in Control Theory and Convex Optimization. " In PROCEEDINGS OF AMERICAN CONTROL CONFERENCE, 1995.

Huibert Kwakernaak and Raphael Sivan, "Linear Optimal Control Systems." WILEY-INTERSCIENCE, 1972.

MATLAB LMI Control Toolbox User's Guide.

Kemin Zhou and John Doyle, "Essentials of Robust Control." Prentice Hall, 1998.

B. D. O. Anderson and J. B. Moore, "Optimal Control Linear Quadratic Methods." Prentice Hall, 1990.

B. D. O. Anderson, "The Inverse Problem of Optimal Control." TECHNICAL REPORT TR No. 6560-3, Stanford Electronics Laboratories, Stanford, Calif. May 1966.

Brian P. Molinari, "The Stable Regulator and its Inverse." IEEE TRANSACTION ON AUTOMATIC CONTROL, AC-is :454-459, 1973.

Francois Delebecque, Laurent El Ghaoui, Jean-Luc Commeau and Ramine Nikoukhah, "LMITOOL-2.1: A Package to Solve LMI Problems," 1999.

F. Alizadeh, J. P. Haeberly, M. V. Nayakkankuppam, and M. L. Overton, "SDPPACK Version 0.8."

Robert H. Miller and William B. Ribbens, "The Effects of Icing on the Longitudinal Dynamics of an Icing Research Aircraft." Number 99-0636 in 37TH AEROSPACE SCIENCES, AIAA, January 1999.

B. C. Moore, "On the Flexibility Offered by State Feedback in Multivariable Systems I Beyond Closed-loop Eigenvalue Assignment." IEEE TRANSACTIONS ON AUTOMATIC CONTROL, AC-21:689-691, October 1976.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for detecting a failure or performance degradation in a dynamic system having sensors for measuring state variables of the system and providing corresponding output signals in response to at least one system input signal, the method comprising:

calculating estimated gains of a filter and selecting an appropriate linear model for processing the output signals based on the at least one system input signal, the step of calculating utilizing at least one model of the dynamic system to obtain estimated signals;

calculating output error residuals based on the output signals and the estimated signals; and detecting at least one hypothesized failure or performance degradation of a component or subsystem of the dynamic system based on the error residuals, wherein the step of calculating the estimated gains is performed optimally with respect to one or more of: noise, uncertainty of parameters of the at least one model and un-modeled dynamics of the dynamic system.

2. The method as claimed in claim 1 wherein the step of calculating estimated gains is performed continually.

3. The method as claimed in claim 1 wherein the dynamic system is a closed-loop dynamic system.

4. The method as claimed in claim 1 further comprising generating a signal for each hypothesized failure or performance degradation and storing each signal in a database for subsequent retrieval.

5. The method as claimed in claim 1 further comprising generating a signal for each hypothesized failure or performance degradation and processing each signal to diagnose the at least one hypothesized failure or performance degradation.

6. The method as claimed in claim 1 further comprising generating a signal for each hypothesized failure or performance degradation and processing each signal to obtain a reconfiguration signal.

7. The method as claimed in claim 6 wherein the dynamic system has a controller and wherein the method further comprises reconfiguring the controller based on the reconfiguration signal to compensate for the at least one hypothesized failure or performance degradation.

8. The method as claimed in claim 7 wherein the at least one hypothesized failure or performance degradation is a failure or degradation of one of the sensors.

9. The method as claimed in claim 8 wherein the reconfiguration signal inserts an estimated or compensated value of the output signal of the failed or degraded sensor into the controller.

10. The method as claimed in claim 6 wherein the dynamic system has a controller and at least one actuator and wherein the method further comprises reconfiguring the controller based on the reconfiguration signal to compensate for a change of the at least one actuator.

11. The method as claimed in claim 1 wherein the dynamic system is a flight vehicle and the sensors include flight control sensors.

12. The method as claimed in claim 1 wherein the dynamic system is a physical system characterized by a nonlinear dynamic model having parameters and wherein changes in the dynamic system are manifest by parameter changes in the nonlinear dynamic model.

13. The method as claimed in claim 1 wherein the error residuals are propagated in a unique direction in output detection space for a given hypothesized failure or performance degradation.

14. The method as claimed in claim 1 wherein the step of calculating estimated gains includes the step of controllably selecting parameters of the at least one model.

15. The method as claimed in claim 1 wherein the step of detecting detects intermittent faults.

16. The method as claimed in claim 13 wherein the step of detecting is based on magnitude and direction of the error residuals in the detection space.

17. The method as claimed in claim 1 wherein the at least one model includes non-dimensional variables and wherein the step of detecting includes the step of converting from the non-dimensional variables to dimensional variables to obtain re-scaled error residuals and wherein the step of detecting is also based on the re-scaled error residuals.

18. The method as claimed in claim 1 wherein a plurality of mathematical models are utilized to model the dynamic system and wherein the step of calculating estimated gains includes the step of selecting one of the plurality of mathematical models.

19. A detection system for detecting a failure or performance degradation in a dynamic system having sensors for measuring state variables of the dynamic system and providing corresponding output signals in response to at least one system input signal, the detection system comprising:

means for calculating estimated gains of a filter and selecting an appropriate linear model for processing the output signals based on the at least one system input signal, the means for calculating utilizing at least one model of the dynamic system to obtain estimated signals;

means for calculating output error residuals based on the output signals and the estimated signals; and means for detecting at least one hypothesized failure or performance degradation of a component or subsystem of the dynamic system based on the error residuals, wherein the means for calculating the estimated gains calculates optimally with respect to one or more of: noise, uncertainty of parameters of the at least one model and un-modeled dynamics of the dynamic system.

20. The detection system as claimed in claim 19 wherein the estimated gains are calculated continually.

21. The detection system as claimed in claim 19 wherein the dynamic system is a closed-loop dynamic system.

22. The detection system as claimed in claim 19 further comprising means for generating a signal for each hypothesized failure or performance degradation and a database for storing each signal for subsequent retrieval.

23. The detection system as claimed in claim 19 further comprising means for generating a signal for each hypothesized failure or performance degradation and means for processing each signal to diagnose the at least one hypothesized failure or performance degradation.

24. The detection system as claimed in claim 19 further comprising means for generating a signal for each hypothesized failure or performance degradation and means for processing each signal to obtain a reconfiguration signal.

25. The detection system as claimed in claim 24 wherein the dynamic system has a controller and wherein the detection system further comprises means for reconfiguring the controller based on the reconfiguration signal to compensate for the at least one hypothesized failure or performance degradation.

26. The detection system as claimed in claim 25 wherein the at least one hypothesized failure or performance degradation is a failure or degradation of one of the sensors.

27. The detection system as claimed in claim 26 wherein the reconfiguration signal inserts an estimated or compensated value of the output signal of the failed or degraded sensor into the controller.

28. The detection system as claimed in claim 24 wherein the dynamic system has a controller and at least one actuator and wherein the detection system further comprises means for reconfiguring the controller based on the reconfiguration signal to compensate for a change of the at least one actuator.

29. The detection system as claimed in claim 19 wherein the dynamic system is a flight vehicle and the sensors include flight control sensors.

30. The detection system as claimed in claim 19 wherein the dynamic system is a physical system characterized by a nonlinear dynamic model having parameters and wherein changes in the dynamic system are manifest by parameter changes in the nonlinear dynamic model.

31. The detection system as claimed in claim 19 wherein the error residuals are propagated in a unique direction in output detection space for a given hypothesized failure or performance degradation.

32. The detection system as claimed in claim 19 wherein the means for calculating estimated gains includes means for controllably selecting parameters of the at least one model.

33. The detection system as claimed in claim 19 wherein the means for detecting detects intermittent faults.

34. The detection system as claimed in claim 31 wherein the means for detecting detects based on magnitude and direction of the error residuals in the detection space.

35. The detection system as claimed in claim 19 wherein the at least one model includes non-dimensional variables and wherein the means for detecting includes means for converting from the non-dimensional variables to dimensional variables to obtain re-scaled error residuals and wherein the means for detecting detects based on the re-scaled error residuals.

36. The detection system as claimed in claim 19 wherein a plurality of mathematical models are utilized to model the dynamic system and wherein the means for calculating estimated gains includes means for selecting one of the plurality of mathematical models.

37. The method as claimed in claim 1 wherein the dynamic system is a financial market or modeled financial system.

38. The detection system as claimed in claim 19 wherein the dynamic system is a financial market or modeled financial system.

* * * * *